US012363327B2

(12) United States Patent
Chen et al.

(10) Patent No.: US 12,363,327 B2
(45) Date of Patent: Jul. 15, 2025

(54) INTER CODING IN VIDEO CODING WITH THE SUPPORT OF MULTIPLE LAYERS

(71) Applicant: Huawei Technologies Co., Ltd., Guangdong (CN)

(72) Inventors: Jianle Chen, San Diego, CA (US); Fnu Hendry, San Diego, CA (US); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 588 days.

(21) Appl. No.: 17/541,710

(22) Filed: Dec. 3, 2021

(65) Prior Publication Data

US 2022/0094954 A1   Mar. 24, 2022

Related U.S. Application Data

(63) Continuation of application No. PCT/US2020/034741, filed on May 27, 2020.
(Continued)

(51) Int. Cl.
*H04N 19/33* (2014.01)
*H04N 19/105* (2014.01)
(Continued)

(52) U.S. Cl.
CPC .......... *H04N 19/33* (2014.11); *H04N 19/105* (2014.11); *H04N 19/132* (2014.11);
(Continued)

(58) Field of Classification Search
CPC .... H04N 19/70; H04N 19/176; H04N 19/186; H04N 19/172; H04N 19/174;
(Continued)

(56) References Cited

U.S. PATENT DOCUMENTS

2008/0117972 A1   5/2008  Ramachandran et al.
2011/0176611 A1   7/2011  Huang et al.
(Continued)

FOREIGN PATENT DOCUMENTS

WO   2018095890 A1   5/2018
WO   2018121506 A1   7/2018
(Continued)

OTHER PUBLICATIONS

Benjamin et al. (Versatile Video Coding (draft 5), Joint Video Experts Team (JVET) of ITU-T SG 16 WP 3 and ISO/IEC JTC 1/SC, 14th Meeting Geneva, CH, Mar. 19-27, 2019) (Year: 2019).*
(Continued)

*Primary Examiner* — Masum Billah
(74) *Attorney, Agent, or Firm* — Conley Rose, P.C.

(57) ABSTRACT

A method of decoding includes receiving the coded video bitstream, the coded video bitstream containing reference picture lists; obtaining reference pictures for a current picture from the reference picture lists; setting a motion vector refinement flag to a first value to enable motion vector refinement for a current block of the current picture when the reference pictures are in a same layer as the current picture; setting the motion vector refinement flag to a second value to disable the motion vector refinement for the current block of the current picture when the reference pictures are in a different layer than the current picture; and refining a motion vector corresponding to the current block when the motion vector refinement flag is set to the first value.

19 Claims, 10 Drawing Sheets

Related U.S. Application Data

(60) Provisional application No. 62/857,152, filed on Jun. 4, 2019.

(51) Int. Cl.
*H04N 19/132* (2014.01)
*H04N 19/172* (2014.01)
*H04N 19/176* (2014.01)
*H04N 19/513* (2014.01)
*H04N 19/70* (2014.01)
*H04N 19/577* (2014.01)

(52) U.S. Cl.
CPC ......... *H04N 19/172* (2014.11); *H04N 19/176* (2014.11); *H04N 19/513* (2014.11); *H04N 19/70* (2014.11); *H04N 19/577* (2014.11)

(58) Field of Classification Search
CPC ...... H04N 19/105; H04N 19/52; H04N 19/56; H04N 19/117
USPC .......................................................... 375/240
See application file for complete search history.

(56) References Cited

U.S. PATENT DOCUMENTS

| | | |
|---|---|---|
| 2014/0294063 A1 | 10/2014 | Chen et al. |
| 2017/0244966 A1 | 8/2017 | Joshi et al. |
| 2018/0262773 A1 | 9/2018 | Chuang et al. |
| 2019/0089974 A1 | 3/2019 | Lee |
| 2019/0132606 A1* | 5/2019 | Su ........................ H04N 19/577 |
| 2019/0208223 A1* | 7/2019 | Galpin ................... H04N 19/52 |
| 2019/0261018 A1* | 8/2019 | Bordes ................. H04N 19/521 |
| 2020/0128258 A1* | 4/2020 | Chen .................... H04N 19/139 |

FOREIGN PATENT DOCUMENTS

| | | |
|---|---|---|
| WO | 2019065444 A1 | 4/2019 |
| WO | 2020232269 A1 | 11/2020 |

OTHER PUBLICATIONS

Document: JVET-N0279, Chen, P., et al., "AHG 19: Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

"Line Transmission of Non-Telephone Signals, Video Codec for Audiovisual Services at p x 64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Auddiovisual and Multimedia Systems Infrastructure of Audiovisual Services—Coding of Moving Video, ITU-T H.263, Jan. 2005, 226 pages.

Bross, et al., "Versatile Video Coding (Draft 5)," Joint Video Experts Team (JVET) of ITU-T SG 16 WP 3 and ISO/IEC ITC 1/SC 29/WG 11, 14th Meeting: Geneva, CH, Mar. 19-27, 2019, JVET-N1001-v6, 384 pages.

* cited by examiner

INTER CODING IN VIDEO CODING WITH THE SUPPORT OF MULTIPLE LAYERS

CROSS-REFERENCE TO RELATED APPLICATIONS

This patent application is a continuation of International Application No. PCT/US2020/034741 filed on May 27, 2020 by Futurewei Technologies, Inc., and titled "Inter Coding in Video Coding with the Support of Multiple Layers," which claims the benefit of U.S. Provisional Patent Application No. 62/857,152 filed Jun. 4, 2019, by Jianle Chen, et al., and titled "Inter Coding in Video Coding with the Support of Multiple Layers," which is hereby incorporated by reference.

TECHNICAL FIELD

In general, this disclosure describes techniques for supporting motion vector refinement in video coding. More specifically, this disclosure allows the motion vector refinement to be disabled when reference pictures are from a different layer than that of a current picture.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding a coded video bitstream implemented by a video decoder. The method includes receiving, by the video decoder, the coded video bitstream containing reference picture lists; obtaining, by the video decoder, reference pictures for a current picture from the reference picture lists; and setting, by the video decoder, a motion vector refinement flag to a second value to disable motion vector refinement for a current block of the current picture when the reference pictures are in a different layer than the current picture.

The method provides techniques that allow motion vector refinement to be selectively disabled when reference pictures are from a different layer than a current picture. By having the ability to selectively disable motion vector refinement when the reference pictures are from a different layer than the current picture, video coding errors (e.g., the division by zero problem) may be avoided. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides setting, by the video decoder, the motion vector refinement flag to a first value to enable the motion vector refinement for the current block of the current picture when the reference pictures are in a same layer as the current picture, and refining, by the video decoder, a motion vector corresponding to the current block when the motion vector refinement flag is set to the first value.

Optionally, in any of the preceding aspects, another implementation of the aspect provides enabling reference picture resampling (RPR) for an entire coded video sequence (CVS) containing the current picture even when the motion vector refinement is disabled.

Optionally, in any of the preceding aspects, another implementation of the aspect provides using a layer identifier to determine whether the reference pictures and the current picture are in the same layer or whether the reference pictures are in the different layer than the current picture.

Optionally, in any of the preceding aspects, another implementation of the aspect provides that the layer identifier is designated as nuh_layer_id.

Optionally, in any of the preceding aspects, another implementation of the aspect provides that the motion vector refinement flag is set in a slice header of the coded video bitstream.

Optionally, in any of the preceding aspects, another implementation of the aspect provides that the motion vector refinement flag is a decoder-side motion vector refinement (DMVR) flag or a bi-directional optical flow (BDOF) flag.

Optionally, in any of the preceding aspects, another implementation of the aspect provides displaying on a display of an electronic device an image generated using the current block.

A second aspect relates to a method of encoding a video bitstream implemented by a video encoder. The method includes obtaining, by the video encoder, reference pictures for a current picture from reference picture lists; and setting, by the video encoder, a motion vector refinement flag to a second value to disable motion vector refinement for a current block of the current picture when the reference pictures are in a different layer than the current picture.

The method provides techniques that allow motion vector refinement to be selectively disabled when reference pictures are from a different layer than a current picture. By having the ability to selectively disable motion vector refinement when the reference pictures are from a different layer than the current picture, video coding errors (e.g., the division by zero problem) may be avoided. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides setting, by the video encoder, the motion vector refinement flag to a first value to enable the motion vector refinement for the current block of the current picture when the reference pictures are in a same layer as the current picture, and refining, by the video encoder, a motion vector corresponding to the current block when the motion vector refinement flag is set to the first value.

Optionally, in any of the preceding aspects, another implementation of the aspect provides determining, by the video encoder, motion vectors for the current picture based on the reference pictures; encoding, by the video encoder, the current picture based on the motion vectors; and decoding, by the video encoder, the current picture using a hypothetical reference decoder.

Optionally, in any of the preceding aspects, another implementation of the aspect provides enabling reference picture resampling (RPR) for an entire coded video sequence (CVS) containing the current picture even when the motion vector refinement is disabled.

Optionally, in any of the preceding aspects, another implementation of the aspect provides that using a layer identifier to determine whether the reference pictures and the current picture are in the same layer or whether the reference pictures are in the different layer than the current picture.

Optionally, in any of the preceding aspects, another implementation of the aspect provides that the layer identifier is designated as nuh_layer_id.

Optionally, in any of the preceding aspects, another implementation of the aspect provides that the motion vector refinement flag is set in a slice header of the coded video bitstream.

Optionally, in any of the preceding aspects, another implementation of the aspect provides transmitting the video bitstream containing the current block toward a video decoder.

A third aspect relates to a decoding device. The decoding device includes a receiver configured to receive a coded video bitstream; a memory coupled to the receiver, the memory storing instructions; and a processor coupled to the memory, the processor configured to execute the instructions to cause the decoding device to: receive a coded video bitstream containing reference picture lists; obtain reference pictures for a current picture from the reference picture lists; and set a motion vector refinement flag to a second value to disable motion vector refinement for a current block of the current picture when the reference pictures are in a different layer than the current picture.

The decoding device provides techniques that allow motion vector refinement to be selectively disabled when reference pictures are from a different layer than a current picture. By having the ability to selectively disable motion vector refinement when the reference pictures are from a different layer than the current picture, video coding errors (e.g., the division by zero problem) may be avoided. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the one or more processors are further configured to set the motion vector refinement flag to a first value to enable the motion vector refinement for the current block of the current picture when the reference pictures are in a same layer as the current picture, and refine a motion vector corresponding to the current block when the motion vector refinement flag is set to the first value.

Optionally, in any of the preceding aspects, another implementation of the aspect provides that reference picture resampling (RPR) is enabled for an entire coded video sequence (CVS) containing the current picture even when the motion vector refinement is disabled.

Optionally, in any of the preceding aspects, another implementation of the aspect provides a display configured to display an image generated based on the current block.

A fourth aspect relates to an encoding device. The encoding device includes a memory containing instructions; a processor coupled to the memory, the processor configured to implement the instructions to cause the encoding device to: obtain reference pictures for a current picture from reference picture lists; and set a motion vector refinement flag to a second value to disable motion vector refinement for a current block of the current picture when the reference pictures are in a different layer than the current picture; and a transmitter coupled to the processor, the transmitter configured to transmit a video bitstream containing the current block toward a video decoder.

The encoding device provides techniques that allow motion vector refinement to be selectively disabled when reference pictures are from a different layer than a current picture. By having the ability to selectively disable motion vector refinement when the reference pictures are from a different layer than the current picture, video coding errors (e.g., the division by zero problem) may be avoided. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the one or more processors are further configured to set the motion vector refinement flag to a first value to enable the motion vector refinement for the current block of the current picture when the reference pictures are in a same layer as the current picture, and refine a motion vector corresponding to the current block when the motion vector refinement flag is set to the first value.

Optionally, in any of the preceding aspects, another implementation of the aspect provides that reference picture resampling (RPR) is enabled for an entire coded video sequence (CVS) containing the current picture even when the motion vector refinement is disabled.

Optionally, in any of the preceding aspects, another implementation of the aspect provides that the memory stores the video bitstream prior to the transmitter transmitting the bitstream toward the video decoder.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

Optionally, in any of the preceding aspects, another implementation of the aspect provides a display configured to display an image generated based on the current block.

The coding apparatus provides techniques that allow motion vector refinement to be selectively disabled when reference pictures are from a different layer than a current picture. By having the ability to selectively disable motion vector refinement when the reference pictures are from a different layer than the current picture, video coding errors (e.g., the division by zero problem) may be avoided. Thus, the coder/decoder (a.k.a., "codec") in video coding is improved relative to current codecs. As a practical matter, the improved video coding process offers the user a better user experience when videos are sent, received, and/or viewed.

A sixth aspect relates to a system. The system includes an encoder; and a decoder in communication with the encoder, wherein the encoder or the decoder includes the decoding device, the encoding device, or the coding apparatus disclosed herein.

The system provides techniques that allow motion vector refinement to be selectively disabled when reference pictures are from a different layer than a current picture. By having the ability to selectively disable motion vector refinement when the reference pictures are from a different layer than the current picture, video coding errors (e.g., the division by zero problem) may be avoided. Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that allow motion vector refinement to be selectively disabled when reference pictures are from a different layer than a current picture. By having the ability to selectively disable motion vector refinement when the reference pictures are from a different layer than the current picture, video coding errors (e.g., the division by zero problem) may be avoided. Thus, the coder/decoder (a.k.a., "codec") in video coding is improved relative to current codecs. As a practical matter, the improved video coding process offers the user a better user experience when videos are sent, received, and/or viewed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, resolution describes the number of pixels in a video file. That is, the resolution is the width and height of the projected image, measured in pixels. For example, a video might have a resolution of 1280 (horizontal pixels)× 720 (vertical pixels). This is usually written as simply 1280×720, or abbreviated to 720p. Bi-directional optical flow (BDOF), decoder-side motion vector refinement (DMVR), and Merge with Motion Vector Difference (MMVD) are processes, algorithms, or coding tools used to refine motion or motion vectors for a predicted block. Reference picture resampling (RPR) is a feature that offers the ability to change the spatial resolution of coded pictures in the middle of a bitstream without the need of intra-coding of the picture at the resolution-changing location.

Figure 1:
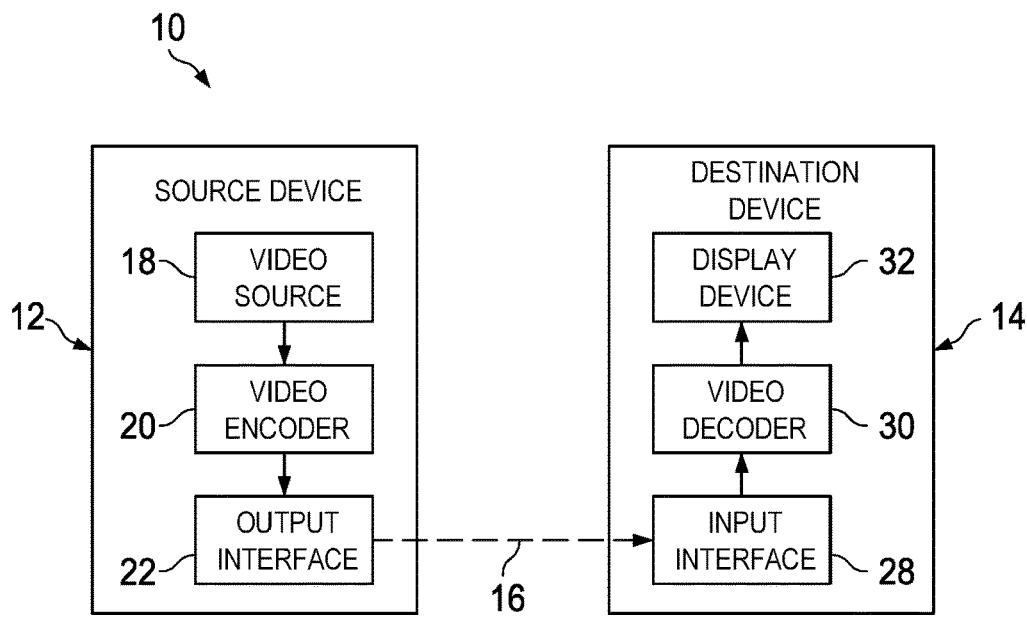
FIG. 1 is a block diagram illustrating an example coding system that may utilize video coding techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
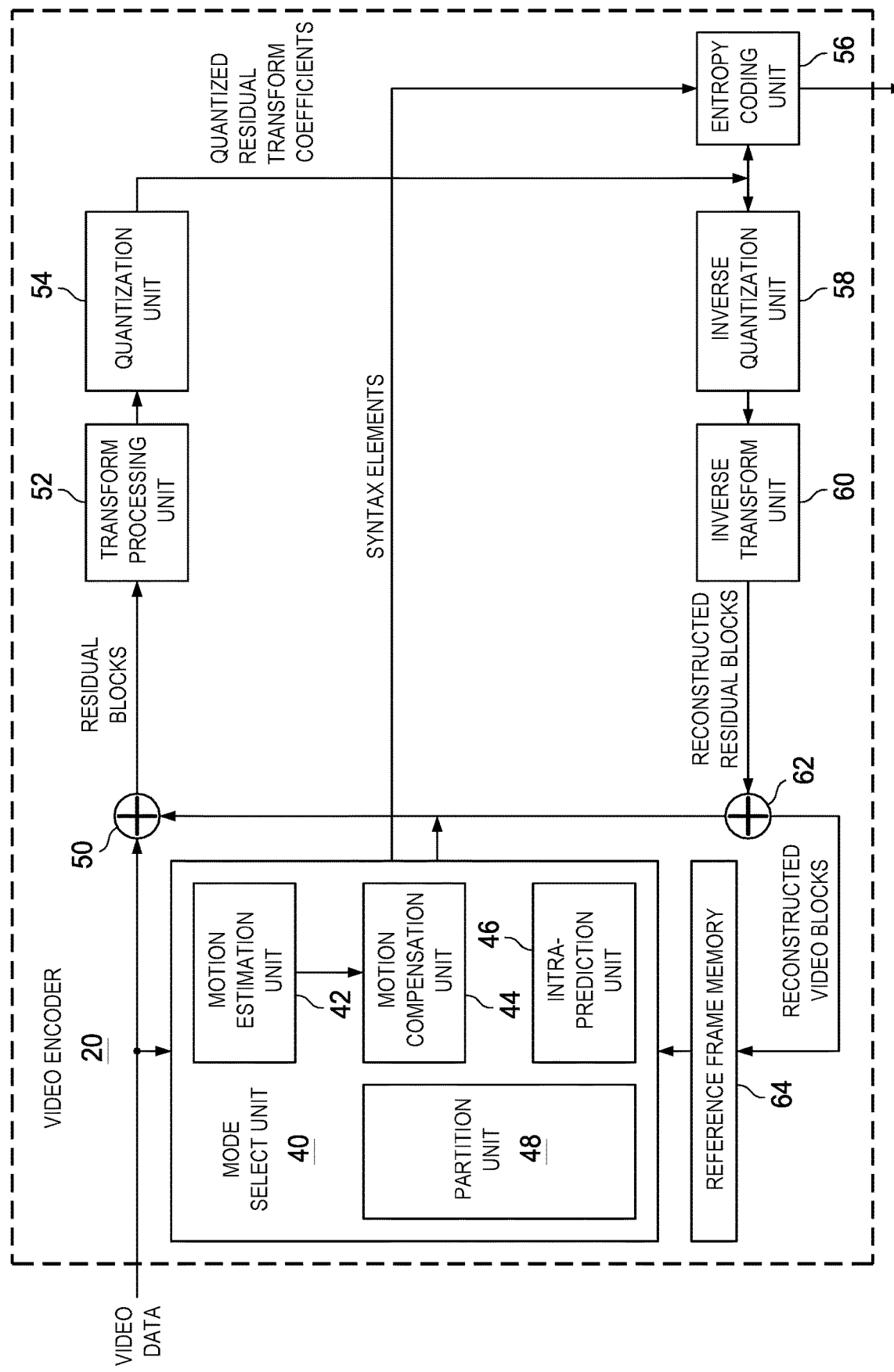
FIG. 2 is a block diagram illustrating an example video encoder that may implement video coding techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
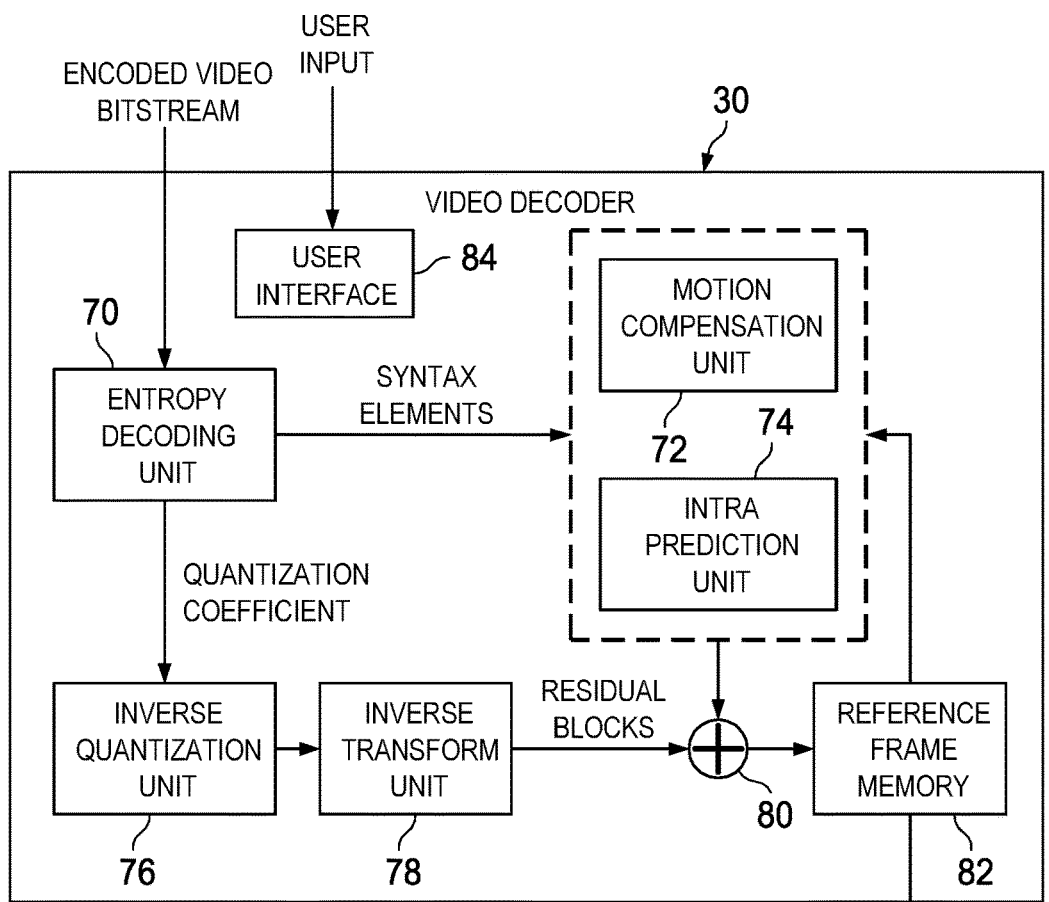
FIG. 3 is a block diagram illustrating an example of a video decoder that may implement video coding techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

In an embodiment, the video decoder 30 includes a user interface (UI) 84. The user interface 84 is configured to receive input from a user of the video decoder 30 (e.g., a network administrator). Through the user interface 84, the user is able to manage or change settings on the video decoder 30. For example, the user is able to input or otherwise provide a value for a parameter (e.g., a flag) in order to control the configuration and/or operation of the video decoder 30 according the user's preference. The user interface 84 may be, for example, a graphical user interface (GUI) that allows a user to interact with the video decoder 30 through graphical icons, drop-down menus, check boxes, and so on. In some cases, the user interface 84 may receive information from the user via a keyboard, a mouse, or other peripheral device. In an embodiment, a user is able to access the user interface 84 via a smart phone, a tablet device, a personal computer located remotely from the video decoder 30, and so on. As used herein, the user interface 84 may be referred to as an external input or an external means.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (WET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

The description of the techniques disclosed herein are based on the under-development video coding standard Versatile Video Coding (VVC) by the joint video experts team (JVET) of ITU-T and ISO/IEC. However, the techniques also apply to other video codec specifications.

The reference picture resampling (RPR) feature is the ability to change the spatial resolution of coded pictures in the middle of a bitstream without the need of intra-coding of the picture at the resolution-changing location. To enable this, a picture needs to be able refer to, for inter prediction purpose, one or more reference pictures for which the spatial resolution is different from that of the current picture. Consequently, resampling of such a reference picture, or part thereof, is needed for encoding and decoding of the current picture. Thus, the name RPR. This feature may also be referred to as adaptive resolution change (ARC) or other names. There are use cases or application scenarios that would benefit from the RPR feature, including the following.

Rate adaption in video telephony and conferencing. This is for adapting the coded video to the changing network conditions. When network conditions get worse so that available bandwidth becomes lower, the encoder may adapt to it by encoding smaller resolution pictures.

Active speaker change in multi-party video conferencing. For multi-party video conferencing, it is common that the video size for the active speaker is bigger or larger than the video size for the rest of conference participants. When the active speaker changes, the picture resolution for each participant may also need to be adjusted. The need to have an ARC feature becomes more important when a change in the active speaker happens frequently.

Fast start in streaming. For a streaming application, it is common that the application will buffer up to a certain length of decoded picture before starting to display pictures. Starting the bitstream with a smaller resolution would allow the application to have enough pictures in the buffer to start displaying faster.

Adaptive stream switching in streaming. The Dynamic Adaptive Streaming over HTTP (DASH) specification includes a feature named @mediaStreamStructureId. This feature enables switching between different representations at open-GOP random access points with non-decodable leading pictures, e.g., clean random access (CRA) pictures with associated random access skipped leading (RASL) pictures in HEVC. When two different representations of the same video have different bitrates but the same spatial resolution while they have the same value of @mediaStreamStructureId, switching between the two representations at a CRA picture with associated RASL pictures can be performed, and the RASL pictures associated with the switching—at CRA pictures can be decoded with acceptable quality hence enabling seamless switching. With ARC, the @mediaStreamStructureId feature would also be usable for switching between DASH representations with different spatial resolutions.

Scalability in video coding usually is supported by using multi-layer coding techniques. A multi-layer bitstream comprises a base layer (BL) and one or more enhancement layers (ELs). Example of scalabilities include spatial scalability, quality/signal-to-noise (SNR) scalability, multi-view scalability, etc. When a multi-layer coding technique is used, a picture or a part thereof may be coded (1) without using a reference picture, i.e., using intra prediction; (2) by referencing to reference pictures that are in the same layer, i.e., using inter prediction; or (3) by referencing to reference pictures that are in other layer(s), i.e., using inter-layer prediction. A reference picture used for inter-layer prediction of the current picture is referred to as an inter-layer reference picture (ILRP).

Figure 4:
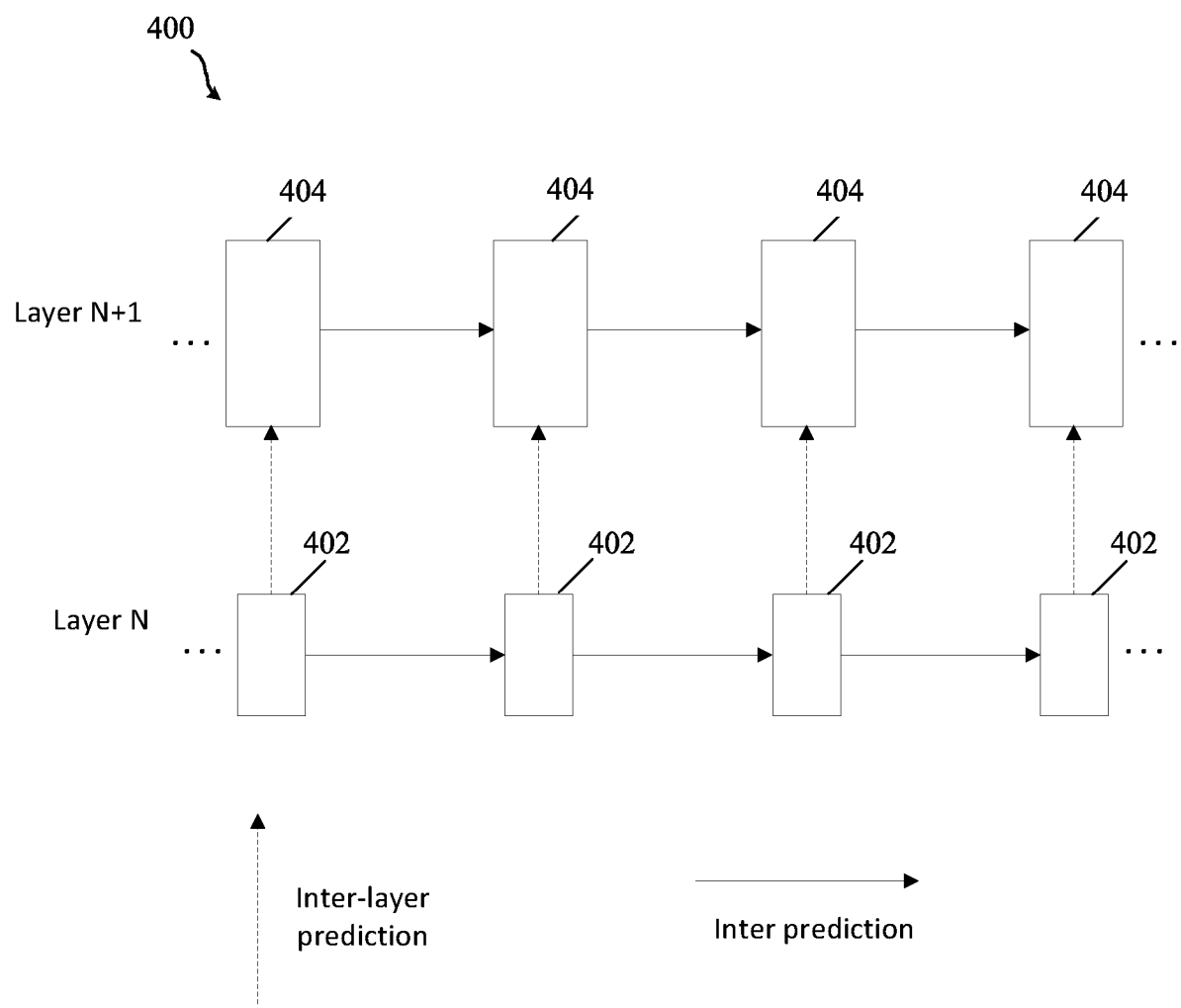
FIG. 4 illustrates illustrates an example of multi-layer coding for spatial scalability.

FIG. 4 illustrates an example of multi-layer coding for spatial scalability 400. The pictures 402 in Layer N have a different resolution (e.g., a lower resolution) than the pictures 404 in Layer N+1. In an embodiment, Layer N is considered to be the base layer and Layer N+1 is considered to be an enhancement layer as described above. In an embodiment, the layers N and N+1 are each uniquely identified by a layer identifier, which may be designated as nuh_layer_id. In an embodiment, a long-term reference picture (LTRP) is a picture with nuh_layer_id equal to the nuh_layer_id of the current picture. In an embodiment, a picture in a different layer is marked as a long-term reference picture. The pictures 402 in Layer N and the pictures 404 in Layer N+1 may be coded using inter prediction (as shown by the solid arrow). The pictures 402 may also be coded using inter-layer prediction (as shown by the dashed arrow).

In the context of RPR, a reference picture may be resampled by either selecting a reference picture from a lower layer or by using inter-layer prediction to generate a higher layer reference picture based on a lower layer reference picture.

Previous H.26x video coding families have provided support for scalability in separate profile(s) from the profile(s) for single-layer coding. Scalable video coding (SVC) is the scalable extension of the AVC/H.264 that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides support for three dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come from the same access unit (AU) and are treated as long-term reference pictures (LTRPs), and are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Spatial scalability uses resampling of a reference picture or parts thereof when an ILRP has different spatial resolution than the current picture being encoded or decoded. Reference picture resampling can be realized at either picture level or coding block level.

In a video codec specification, pictures need to be identified for multiple purposes including for use as a reference picture in inter prediction, for output of pictures from the decoded picture buffer (DPB), for scaling of motion vectors, for weighted prediction, etc.

In AVC and HEVC, pictures can be identified by picture order count (POC).

In AVC and HEVC, pictures in the DPB can be marked as "used for short-term reference," "used for long-term reference," or "unused for reference." Once a picture has been marked "unused for reference," the picture can no longer be used for prediction, and when the picture is no longer needed for output the picture can be removed from the DPB.

In AVC, there are two types of reference pictures, short-term and long-term. A reference picture may be marked as "unused for reference" when the picture is no longer needed for prediction reference. The conversion among these three statuses (short-term, long-term, and unused for reference) is controlled by the decoded reference picture marking process. There are two alternative decoded reference picture marking mechanisms, the implicit sliding window process and the explicit memory management control operation (MMCO) process. The sliding window process marks a short-term reference picture as "unused for reference" when the number of reference frames is equal to a given maximum number (max_num_ref_frames in the SPS). The short-term reference pictures are stored in a first-in, first-out manner so that the most recently decoded short-term pictures are kept in the DPB.

The explicit MMCO process may include multiple MMCO commands. An MMCO command may mark one or more short-term or long-term reference pictures as "unused for reference," mark all the pictures as "unused for reference," or mark the current reference picture or an existing short-term reference picture as long-term and assign a long-term picture index to that long-term reference picture.

In AVC, the reference picture marking operations as well as the processes for output and removal of pictures from the DPB are performed after a picture has been decoded.

HEVC introduces a different approach for reference picture management, referred to as reference picture set (RPS). The most fundamental difference with the RPS concept compared to MMCO/sliding window of AVC is that for each particular slice a complete set of the reference pictures that are used by the current picture or any subsequent picture is provided. Thus, a complete set of all pictures that must be kept in the DPB for use by the current or future picture is signaled. This is different from the AVC scheme where only relative changes to the DPB are signaled. With the RPS concept, no information from earlier pictures in decoding order is needed to maintain the correct status of reference pictures in the DPB.

The order of picture decoding and DPB operations in HEVC is changed compared to AVC in order to exploit the advantages of RPS and improve error resilience. In AVC, picture marking and buffer operations (both output and removal of decoded pictures from the DPB) are generally applied after a current picture has been decoded. In HEVC, the RPS is first decoded from a slice header of the current picture, then picture marking and buffer operations are generally applied before decoding the current picture.

The latest VVC WD includes an approach for reference picture management based on two reference picture lists, reference picture list 0 and reference picture list 1. With that approach, reference picture lists for a picture are directly constructed without using a reference picture list initialization process and a reference picture list modification process. Furthermore, reference picture marking is directly based on the two reference picture lists.

Motion vector refinement is a process for revising a motion vector to obtain a more optimal match (e.g., less residual) between a current block and a reference block to achieve a better coding result. VVC includes some inter coding tools like bi-directional optical flow (BDOF), decoder-side motion vector refinement (DMVR), and Merge with Motion Vector Difference (MMVD) where delta POC based scaling of motion vectors and/or sample values are involved. In a multi-layer video codec based on VVC with inter-layer prediction, delta POC based scaling used in such tools cannot be applied as the collocated picture and the current picture are associated with the same presentation time or capturing time and, consequently, often have the same POC value, which would lead to a division by zero problem. However, there lacks such a mechanism to disable such behavior.

Disclosed herein are techniques that allow motion vector refinement such as DMVR, BDOF, and MMVD to be selectively disabled when reference pictures are from a different layer than a current picture. By having the ability to selectively disable motion vector refinement when the reference pictures are from a different layer than the current picture, video coding errors (e.g., the division by zero problem) may be avoided. Thus, the coder/decoder (a.k.a., "codec") in video coding is improved relative to current codecs. As a practical matter, the improved video coding process offers the user a better user experience when videos are sent, received, and/or viewed.

Figure 5:
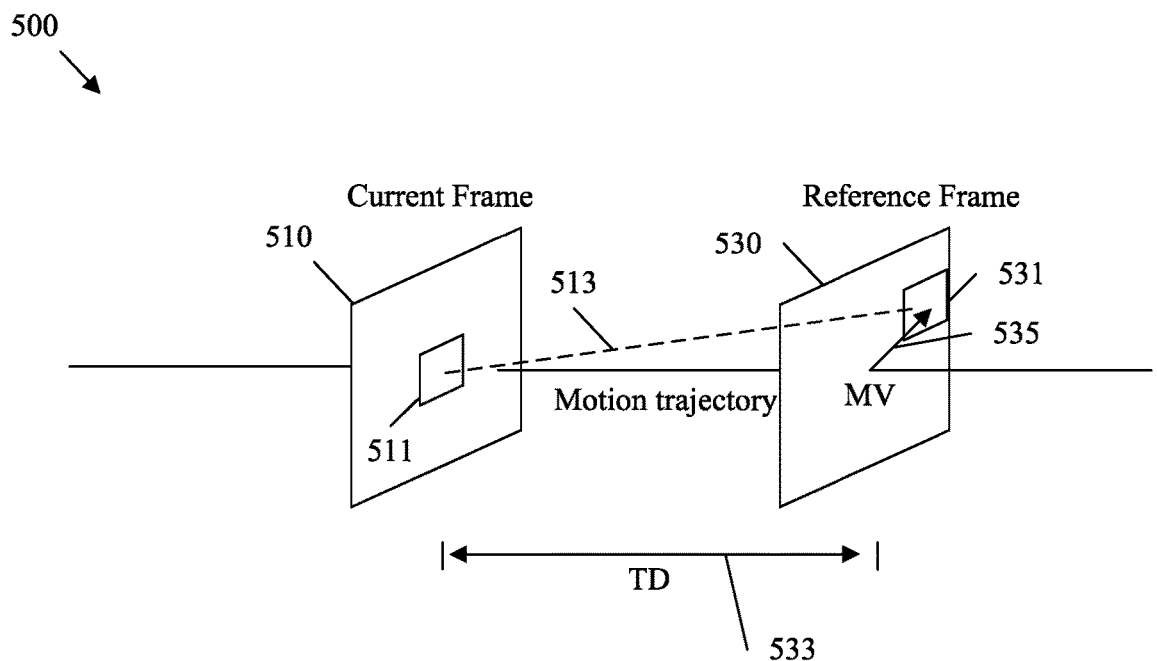
FIG. 5 is a schematic diagram illustrating an example of unidirectional inter prediction.

FIG. 5 is a schematic diagram illustrating an example of unidirectional inter prediction 500. Unidirectional inter prediction 500 can be employed to determine motion vectors for encoded and/or decoded blocks created when partitioning a picture.

Unidirectional inter prediction 500 employs a reference frame 530 with a reference block 531 to predict a current block 511 in a current frame 510. The reference frame 530 may be temporally positioned after the current frame 510 as shown (e.g., as a subsequent reference frame), but may also be temporally positioned before the current frame 510 (e.g., as a preceding reference frame) in some examples. The current frame 510 is an example frame/picture being encoded/decoded at a particular time. The current frame 510 contains an object in the current block 511 that matches an object in the reference block 531 of the reference frame 530. The reference frame 530 is a frame that is employed as a reference for encoding a current frame 510, and a reference block 531 is a block in the reference frame 530 that contains an object also contained in the current block 511 of the current frame 510.

The current block 511 is any coding unit that is being encoded/decoded at a specified point in the coding process. The current block 511 may be an entire partitioned block, or may be a sub-block when employing affine inter prediction mode. The current frame 510 is separated from the reference frame 530 by some temporal distance (TD) 533. The TD 533 indicates an amount of time between the current frame 510 and the reference frame 530 in a video sequence, and may be measured in units of frames. The prediction information for the current block 511 may reference the reference frame 530 and/or reference block 531 by a reference index indicating the direction and temporal distance between the frames. Over the time period represented by the TD 533, the object in the current block 511 moves from a position in the current frame 510 to another position in the reference frame 530 (e.g., the position of the reference block 531). For example, the object may move along a motion trajectory 513, which is a direction of movement of an object over time. A motion vector 535 describes the direction and magnitude of the movement of the object along the motion trajectory 513 over the TD 533. Accordingly, an encoded motion vector 535, a reference block 531, and a residual including the difference between the current block 511 and the reference block 531 provides information sufficient to reconstruct a current block 511 and position the current block 511 in the current frame 510.

Figure 6:
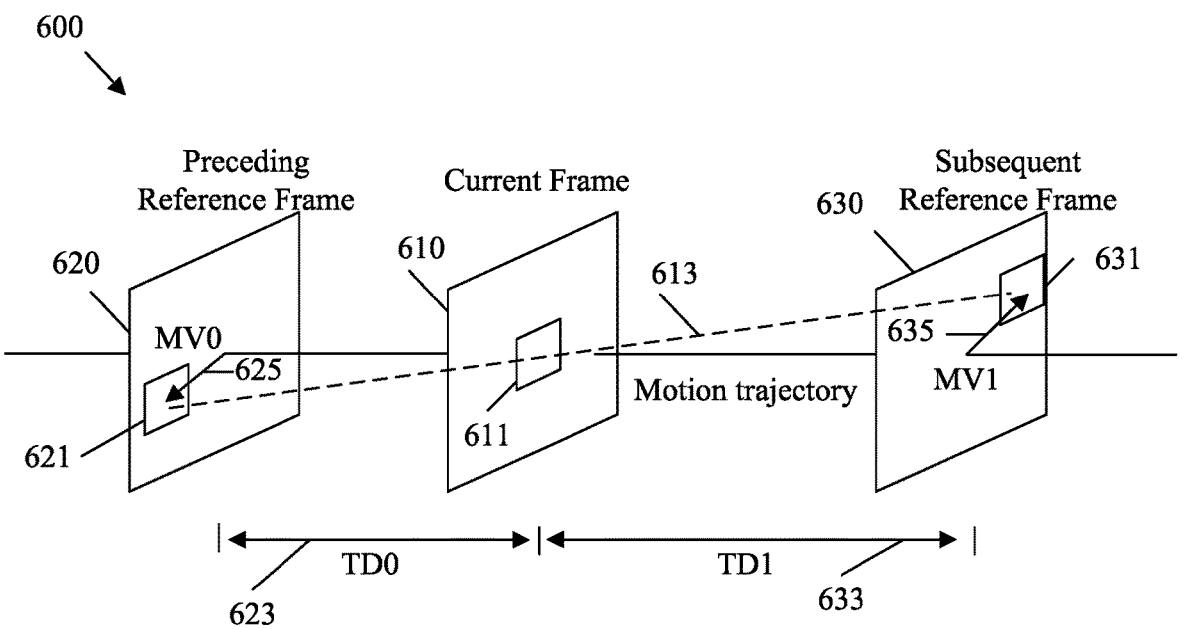
FIG. 6 is a schematic diagram illustrating an example of bidirectional inter prediction.

FIG. 6 is a schematic diagram illustrating an example of bidirectional inter prediction 600. Bidirectional inter prediction 600 can be employed to determine motion vectors for encoded and/or decode blocks created when partitioning a picture.

Bidirectional inter prediction 600 is similar to unidirectional inter prediction 500, but employs a pair of reference frames to predict a current block 611 in a current frame 610. Hence current frame 610 and current block 611 are substantially similar to current frame 510 and current block 511, respectively. The current frame 610 is temporally positioned between a preceding reference frame 620, which occurs before the current frame 610 in the video sequence, and a subsequent reference frame 630, which occurs after the current frame 610 in the video sequence. Preceding reference frame 620 and subsequent reference frame 630 are otherwise substantially similar to reference frame 530.

The current block 611 is matched to a preceding reference block 621 in the preceding reference frame 620 and to a subsequent reference block 631 in the subsequent reference frame 630. Such a match indicates that, over the course of the video sequence, an object moves from a position at the preceding reference block 621 to a position at the subsequent reference block 631 along a motion trajectory 613 and via the current block 611. The current frame 610 is separated from the preceding reference frame 620 by some preceding temporal distance (TD0) 623 and separated from the subsequent reference frame 630 by some subsequent temporal distance (TD1) 633. The TD0 623 indicates an amount of time between the preceding reference frame 620 and the current frame 610 in the video sequence in units of frames. The TD1 633 indicates an amount of time between the current frame 610 and the subsequent reference frame 630 in the video sequence in units of frame. Hence, the object moves from the preceding reference block 621 to the current block 611 along the motion trajectory 613 over a time period indicated by TD0 623. The object also moves from the current block 611 to the subsequent reference block 631 along the motion trajectory 613 over a time period indicated by TD1 633. The prediction information for the current block 611 may reference the preceding reference frame 620 and/or preceding reference block 621 and the subsequent reference frame 630 and/or subsequent reference block 631 by a pair of reference indices indicating the direction and temporal distance between the frames.

A preceding motion vector (MV0) 625 describes the direction and magnitude of the movement of the object along the motion trajectory 613 over the TD0 623 (e.g., between the preceding reference frame 620 and the current frame 610). A subsequent motion vector (MV1) 635 describes the direction and magnitude of the movement of the object along the motion trajectory 613 over the TD1 633 (e.g., between the current frame 610 and the subsequent reference frame 630). As such, in bidirectional inter prediction 600, the current block 611 can be coded and reconstructed by employing the preceding reference block 621 and/or the subsequent reference block 631, MV0 625, and MV1 635.

In an embodiment, inter prediction and/or bidirectional inter prediction may be carried out on a sample-by-sample (e.g., pixel-by-pixel) basis instead of on a block-by-block basis. That is, a motion vector pointing to each sample in the preceding reference block 621 and/or the subsequent reference block 631 can be determined for each sample in the current block 611. In such embodiments, the motion vector 625 and the motion vector 635 depicted in FIG. 6 represent a plurality of motion vectors corresponding to the plurality of samples in the current block 611, the preceding reference block 621, and the subsequent reference block 631.

In both merge mode and advanced motion vector prediction (AMVP) mode, a candidate list is generated by adding candidate motion vectors to a candidate list in an order defined by a candidate list determination pattern. Such candidate motion vectors may include motion vectors according to unidirectional inter prediction 500, bidirectional inter prediction 600, or combinations thereof. Specifically, motion vectors are generated for neighboring blocks when such blocks are encoded. Such motion vectors are added to a candidate list for the current block, and the motion vector for the current block is selected from the candidate list. The motion vector can then be signaled as the index of the selected motion vector in the candidate list. The decoder can construct the candidate list using the same process as the encoder, and can determine the selected motion vector from the candidate list based on the signaled index. Hence, the candidate motion vectors include motion vectors generated according to unidirectional inter prediction 500 and/or bidirectional inter prediction 600, depending on which approach is used when such neighboring blocks are encoded.

Figure 7:
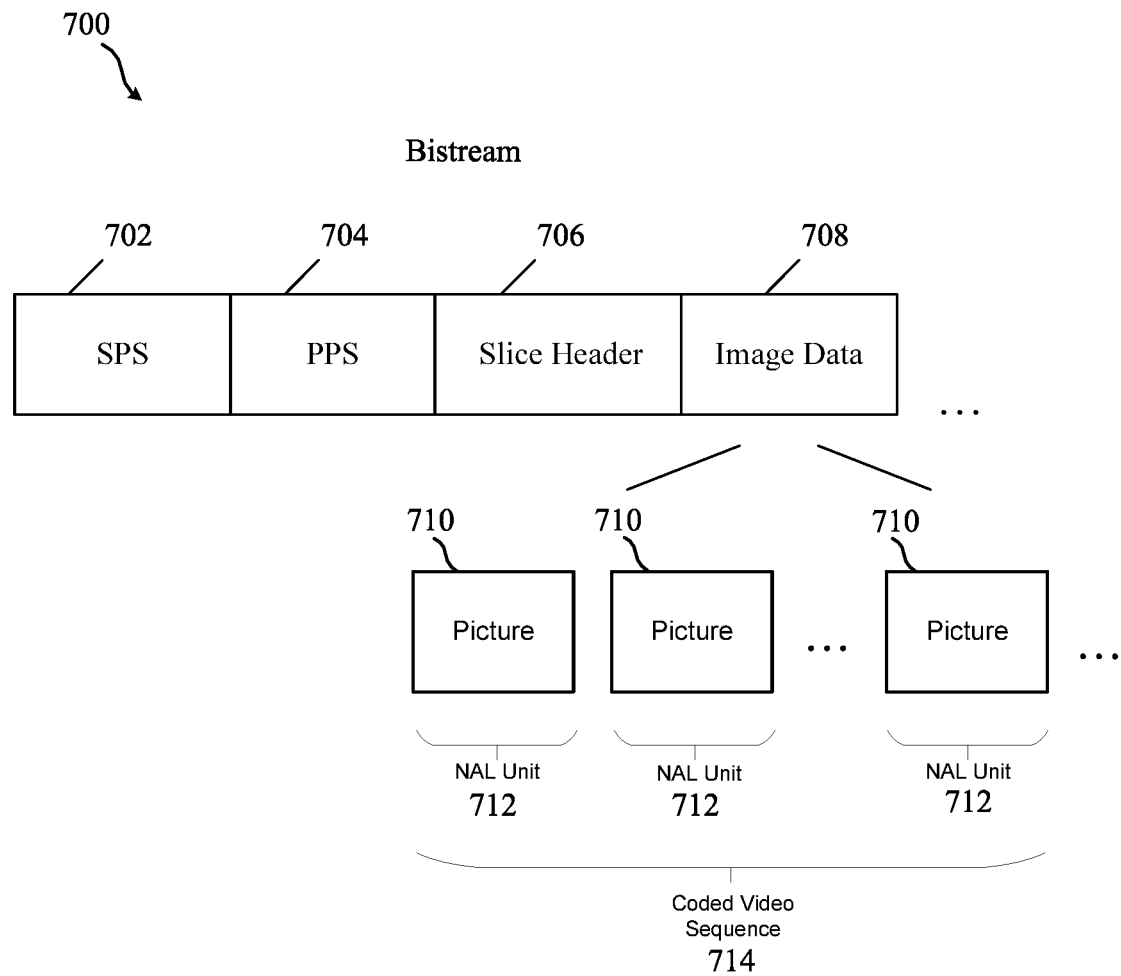
FIG. 7 illustrates a video bitstream.

FIG. 7 illustrates a video bitstream 700. As used herein the video bitstream 700 may also be referred to as a coded video bitstream, a bitstream, or variations thereof. As shown in FIG. 7, the bitstream 700 comprises a sequence parameter set (SPS) 702, a picture parameter set (PPS) 704, a slice header 706, and image data 708.

The SPS 702 contains data that is common to all the pictures in a sequence of pictures (SOP). In contrast, the PPS 704 contains data that is common to the entire picture. The slice header 706 contains information about the current slice such as, for example, the slice type, which of the reference pictures will be used, and so on. The SPS 702 and the PPS 704 may be generically referred to as a parameter set. The SPS 702, the PPS 704, and the slice header 708 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important header data that can apply to a large number of VCL NAL units) and supplemental enhancement information (timing information and other supplemental data that may enhance usability of the decoded video signal but are not necessary for decoding the values of the samples in the video pictures). Those skilled in the art will appreciate that the bitstream 700 may contain other parameters and information in practical applications.

The image data 708 of FIG. 7 comprises data associated with the images or video being encoded or decoded. The image data 708 may be simply referred to as the payload or data being carried in the bitstream 700. In an embodiment, the image data 708 comprises the coded video sequence (CVS) 714 (or CLVS) containing a pluarlity of pictures 710. The CVS 714 is a coded video sequence for every coded layer video sequence (CLVS) in the video bitstream 700. Notably, the CVS and the CLVS are the same when the video bitstream 700 includes a single layer. The CVS and the CLVS are only different when the video bitstream 700 includes multiple layers.

As shown in FIG. 7, a slice of each picture 710 may be contained within its own VCL NAL unit 712. The set of VCL NAL units 712 in the CVS 714 may be referred to as an access unit.

Figure 8:
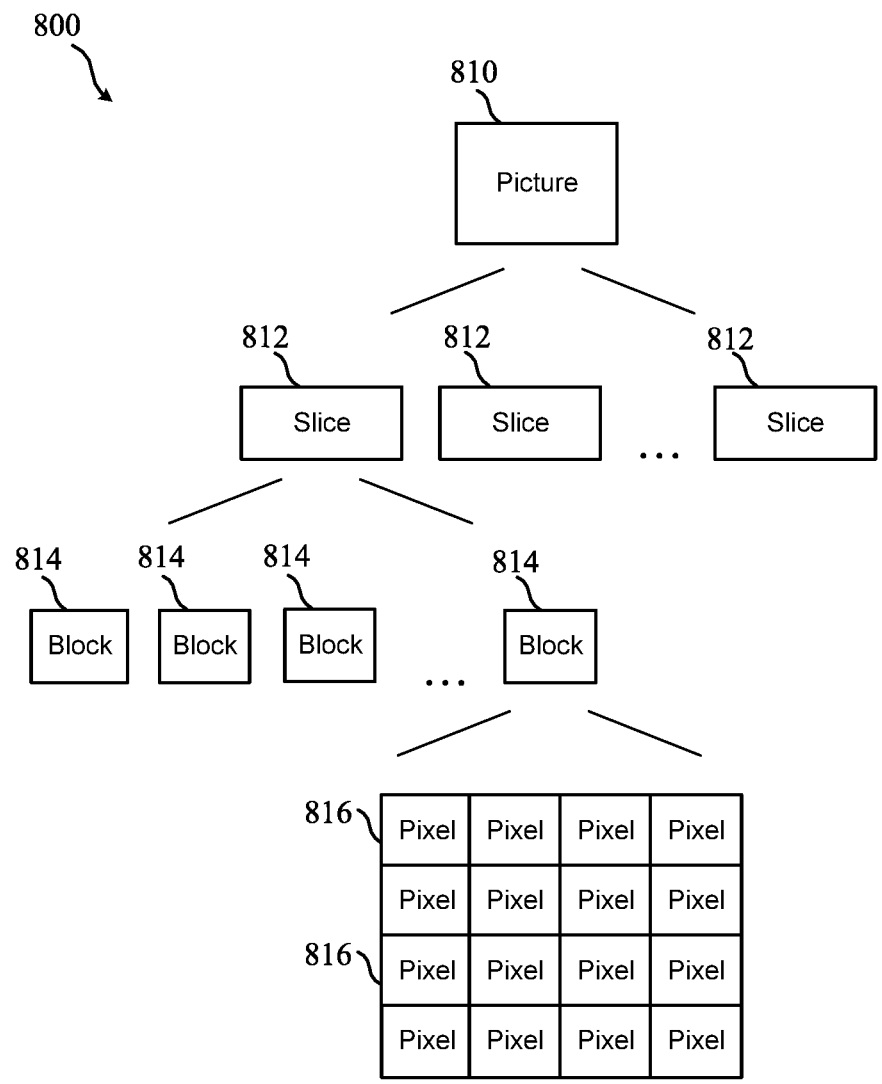
FIG. 8 illustrates a partitioning technique for a picture.

FIG. 8 illustrates a partitioning technique 800 for a picture 810. The picture 810 may be similar to any of the pictures 710 in FIG. 7. As shown, the picture 810 may be partitioned into a plurality of slices 812. A slice is a spatially distinct region of a frame (e.g., a picture) that is encoded separately from any other region in the same frame. While three slices 812 are depicted in FIG. 8, more or fewer slices may be used in practical applications. Each slice 812 may be partitioned into a plurality of blocks 814. The blocks 814 in FIG. 8 may be similar to the current block 611, the preceding reference block 621, and the subsequent reference block 631 in FIG. 6. The block 814 may represent a CU. While four blocks 814 are depicted in FIG. 8, more or fewer blocks may be used in practical applications.

Each block 814 may be partitioned into a plurality of samples 816 (e.g., pixels). In an embodiment, the size of each block 814 is measured in luma samples. While sixteen samples 816 are depicted in FIG. 8, more or fewer samples may be used in practical applications.

Figure 9:
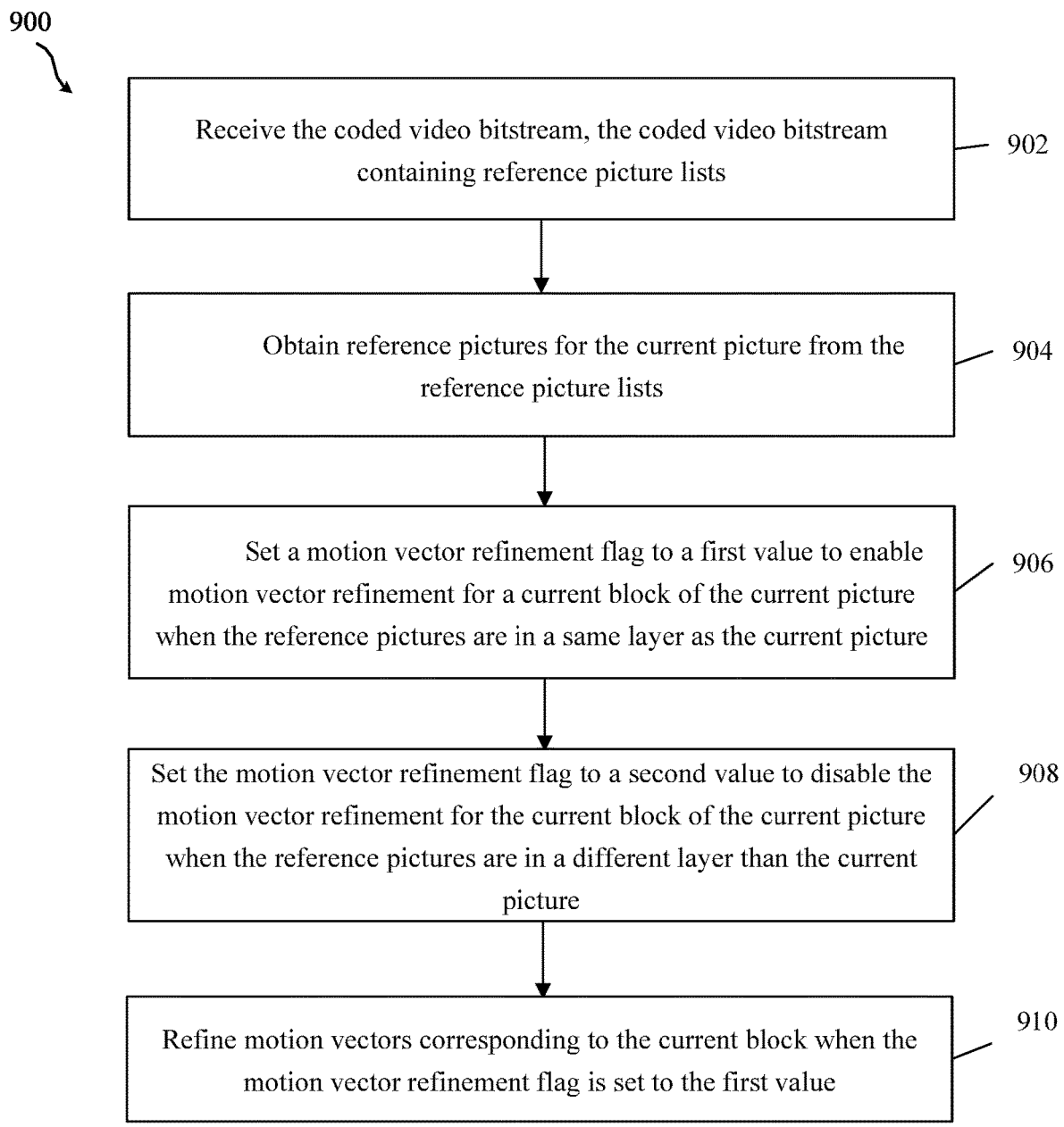
FIG. 9 is an embodiment of a method of decoding a coded video bitstream.

FIG. 9 is an embodiment of a method 900 of decoding a coded video bitstream implemented by a video decoder (e.g., video decoder 30). The method 900 may be performed after the decoded bitstream has been directly or indirectly received from a video encoder (e.g., video encoder 20). The method 900 improves the decoding process by allowing motion vector refinement to be selectively disabled when the reference pictures are from a different layer than the current picture. By having the ability to selectively disable motion vector refinement in this manner, coding efficiency may be improved. Therefore, as a practical matter, the performance of a codec is improved, which leads to a better user experience.

In block 902, the video decoder receives the coded video bitstream (e.g., the bitstream 700). The coded video bitstream contains reference picture lists. A reference picture list is a list of reference pictures that may be used for inter prediction. The reference picture lists may be designated reference picture list (RPL) 0 and RPL 1, RefPicList[0] and RefPicList[1], or something similar. In an embodiment, a reference picture list structure contains the reference picture lists. In an embodiment, the reference picture lists are used for bi-directional inter prediction. In block 904, the video decoder obtains reference pictures for a current picture from the reference picture lists.

In block 906, the video decoder sets a motion vector refinement flag to a first value to enable motion vector refinement for a current block of the current picture when the reference pictures are in a same layer as the current picture (e.g., the reference pictures are all in Layer N in FIG. 4). In an embodiment, the first value is one, TRUE, or some other value.

In block 908, the video decoder sets the motion vector refinement flag to a second value to disable the motion vector refinement for the current block of the current picture when the reference pictures are in a different layer than the current picture (e.g., the reference pictures are in Layer N+1 and the current picture is in Layer N in FIG. 4). In an embodiment, the second value is zero, FALSE, or some other value.

In an embodiment, the video decoder enables reference picture resampling (RPR) for an entire coded video sequence (CVS) containing the current picture even when the motion vector refinement is disabled.

In an embodiment, the video decoder uses a layer identifier to determine whether the reference pictures and the current picture are in the same layer or whether the reference pictures are in the different layer than the current picture. In an embodiment, the layer identifier is designated as nuh_layer_id. In an embodiment, the motion vector refinement flag is set in a slice header of the coded video bitstream.

In an embodiment, the motion vector refinement flag is a decoder-side motion vector refinement (DMVR) flag or a bi-directional optical flow (BDOF) flag.

In block 910, the video decoder refines a motion vector corresponding to the current block when the motion vector refinement flag is set to the first value. In an embodiment, the motion vectors are refined using DMVR, BDOF, or MMVD. In an embodiment, the DMVR approach refines the initial motion vector (MV) from a merge mode by searching the block with the smallest matching cost in the previously-decoded reference pictures. With BDOF, bi-predictive prediction samples of one coding block are enhanced via higher-precision MVs derived from its two reference blocks. MMVD is a simplified MV expression method based on statistical MVD modeling using three components (e.g., starting point, motion magnitude, motion direction).

In an embodiment, an image generated based on the current picture is displayed for a user of an electronic device (e.g., a smart phone, tablet, laptop, personal computer, etc.).

Figure 10:
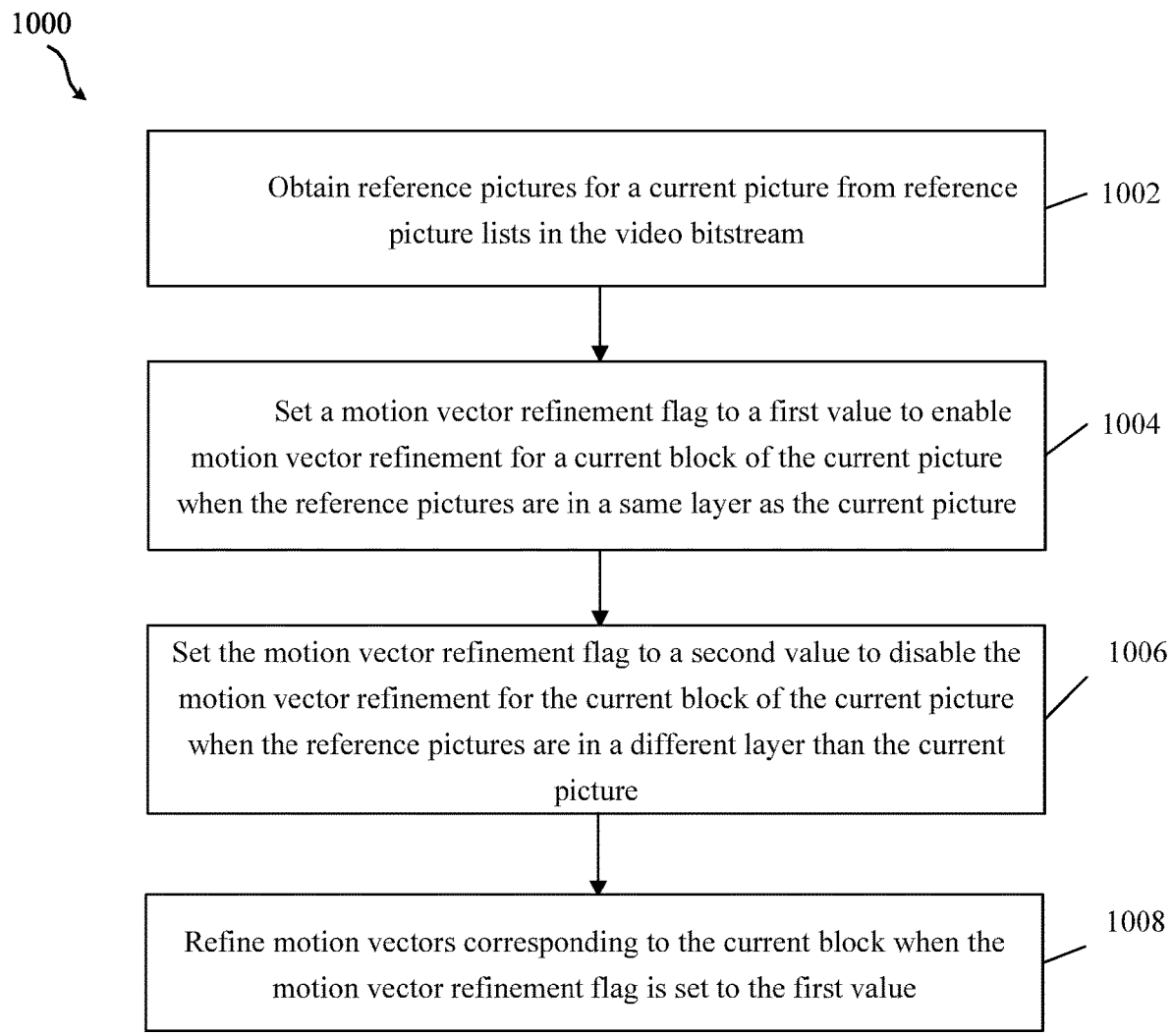
FIG. 10 is an embodiment of a method of encoding a coded video bitstream.

FIG. 10 is an embodiment of a method 1000 of encoding a video bitstream implemented by a video encoder (e.g., video encoder 20). The method 1000 may be performed when a picture (e.g., from a video) is to be encoded into a video bitstream and then transmitted toward a video decoder (e.g., video decoder 30). The method 1000 improves the decoding process by allowing motion vector refinement to be selectively disabled when the reference pictures are from a different layer than the current picture. By having the ability to selectively disable DMVR in this manner, coding efficiency may be improved. Therefore, as a practical matter, the performance of a codec is improved, which leads to a better user experience.

In block 1002, the video encoder obtains reference pictures for a current picture from reference picture lists in the video bitstream. The reference picture lists may be designated reference picture list (RPL) 0 and RPL 1, RefPicList[0] and RefPicList[1], or something similar. In an embodiment, following the obtaining in block 1002, the method 1000 includes determining motion vectors for the current picture based on the reference pictures, encoding the current picture based on the motion vectors, and decoding the current picture using a hypothetical reference decoder (HRD).

In block 1004, the video encoder sets a motion vector refinement flag to a first value to enable motion vector refinement for a current block of the current picture when the reference pictures are in a same layer as the current picture (e.g., the reference pictures are all in Layer N in FIG. 4). In an embodiment, the first value is one, TRUE, or some other value.

In block 1006, the video encoder sets the motion vector refinement flag to a second value to disable the motion vector refinement for the current block of the current picture when the reference pictures are in a different layer than the current picture (e.g., the reference pictures are in Layer N+1 and the current picture is in Layer N in FIG. 4). In an embodiment, the second value is zero, FALSE, or some other value.

In an embodiment, the video decoder enables reference picture resampling (RPR) for an entire coded video sequence (CVS) containing the current picture even when the motion vector refinement is disabled.

In an embodiment, the video decoder uses a layer identifier to determine whether the reference pictures and the current picture are in the same layer or whether the reference pictures are in the different layer than the current picture. In an embodiment, the layer identifier is designated as nuh_layer_id. In an embodiment, the motion vector refinement flag is set in a slice header of the coded video bitstream.

In an embodiment, the motion vector refinement flag is a decoder-side motion vector refinement (DMVR) flag or a bi-directional optical flow (BDOF) flag.

In block 1008, the video encoder refines a motion vector corresponding to the current block when the motion vector refinement flag is set to the first value. In an embodiment, the motion vector is refined using DMVR, BDOF, or MMVD.

In an embodiment, the video encoder generates a video bitstream containing the current block and transmits the bitstream toward a video decoder. In an embodiment, the video encoder stores the video bitstream for transmission toward the video decoder.

In an embodiment, a flag, which when equal to 1 specifying the use of DMVR for a CU, is set equal to FALSE whenever the reference picture for the CU from RPL 0 or the reference picture for the CU from RPL 1 is from a different layer of the current picture.

In an embodiment, a POC delta based scaling of motion vectors for a CU in the current picture is applied only when none of the following conditions is true.

The POC delta between the current picture and the reference picture for the CU from RPL 0 is not the same as the POC delta between the reference picture for the CU from RPL 1 and the current picture.

The reference picture is from a different layer than the current picture. Alternatively, this condition is replaced by "Either the POC delta between the current picture and the reference picture of RPL 0 or the POC delta between the reference picture of RPL 1 and the current picture is equal to 0."

Alternatively, a flag is derived for each reference picture of a slice to specify whether CUs in the slice may use POC delta based scaling of motion vectors to the reference picture. The flag may be derived during reference picture list construction process.

In an embodiment, a flag, which when equal to 1 specifying the use of BDOF for a CU, is set equal to FALSE whenever the reference picture for the CU from RPL 0 of RPL 0 or the reference picture for the CU from RPL 1 is from a different layer of the current picture.

In an embodiment, POC delta based scaling of motion vectors for a CU coded in MMVD mode is not applied whenever the reference picture for the CU from RPL 0 or the reference picture for the CU from RPL 1 is from a different layer of the current picture.

The following syntax and semantics may be employed to implement the embodiments disclosed herein. The following description is relative to the basis text, which is the latest VVC draft specification. In other words, only the delta is described, while the text in the basis text that are not mentioned below apply as they are. Added text relative to the basis text is shown in bold, and removed text is shown in italics.

General decoding process for coding units coded in inter prediction mode is discussed.

Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 of the VVC standard is invoked with the luma location (xCb, yCb), the width of the current coding block in luma samples cbWidth and the height of the current coding block in luma samples cbHeight, and the variable treeType as inputs.

The decoding process for coding units coded in inter prediction mode consists of the following ordered steps:
1. The variable dmvrFlag is set equal to 0.
2. The motion vector components and reference indices of the current coding unit are derived as follows:
If merge_triangle_flag[xCb][yCb], inter_affine_flag[xCb][yCb] and merge_subblock_flag[xCb][yCb] are all equal to 0, the following applies:
The derivation process for motion vector components and reference indices as specified in clause 8.5.2.1 is invoked with the luma coding block location (xCb, yCb), the luma coding block width cbWidth and the luma coding block height cbHeight as inputs, and the luma motion vectors mVL0[0][0] and mVL1[0][0], the reference indices refIdxL0 and refIdxL1 and the prediction list utilization flags predFlagL0[0][0] and predFlagL1[0][0], and the bi-prediction weight index gbiIdx as outputs.

When all of the following conditions are true, dmvrFlag is set equal to 1:
sps_dmvr_enabled_flag is equal to 1
merge_flag[xCb][yCb] is equal to 1
both predFlagL0[0][0] and predFlagL1[0][0] are equal to 1
mmvd_flag[xCb][yCb] is equal to 0
DiffPicOrderCnt(currPic, RefPicList[0][refIdxL0]) is equal to DiffPicOrderCnt (RefPicList[1][refIdx1], currPic)
cbHeight is greater than or equal to 8
cbHeight*cbWidth is greater than or equal to 64
The nuh_layer_id of RefPicList[0][refIdxL0] is the same as the current picture currPic.

The nuh_layer_id of RefPicList[1][refIdxL1] is the same as the current picture currPic.

If dmvrFlag is equal to 1, the following applies:

For X being 0 and 1, the reference picture consisting of an ordered two-dimensional array refPicLX$_L$ of luma samples and two ordered two-dimensional arrays refPicLX$_{Cb}$ and refPicLX$_{Cr}$ of chroma samples is derived by invoking the process specified in clause 8.5.7.2 with X and refIdxLX as inputs.

The number of luma coding subblocks in horizontal direction numSbX and in vertical direction numSbY, the subblock width sbWidth and the subblock height sbHeight are derived as follows:

$$\text{num}SbX=(cb\text{Width}>16)?(cb\text{Width}>>4):1 \quad (8\text{-}255)$$

$$\text{num}SbY=(cb\text{Height}>16)?(cb\text{Height}>>4):1 \quad (8\text{-}256)$$

$$sb\text{Width}=(cb\text{Width}>16)?16:cb\text{Width} \quad (8\text{-}257)$$

$$sb\text{Height}=(cb\text{Height}>16)?16:cb\text{Height} \quad (8\text{-}258)$$

For xSbIdx=0 . . . numSbX−1 and ySbIdx=0 . . . numSbY−1, the following applies.

The luma motion vectors mvLX[xSbIdx][ySbIdx] and the prediction list utilization flags predFlagLX[xSbIdx][ySbIdx] with X equal to 0 and 1, and the luma location (xSb[xSbIdx][ySbIdx], ySb[xSbIdx][ySbIdx]) specifying the top-left sample of the coding subblock relative to the top-left luma sample of the current picture are derived as follows:

$$mvLX[xSb\text{Idx}][ySb\text{Idx}]=mvLX[0][0] \quad (8\text{-}259)$$

$$\text{predFlag}LX[xSb\text{Idx}][ySb\text{Idx}]=\text{predFlag}LX[0][0] \quad (8\text{-}260)$$

$$xSb[xSb\text{Idx}][ySb\text{Idx}]=xCb+xSb\text{Idx}*sb\text{Width} \quad (8\text{-}261)$$

$$ySb[xSb\text{Idx}][ySb\text{Idx}]=yCb+ySb\text{Idx}*sb\text{Height} \quad (8\text{-}262)$$

The decoder side motion vector refinement process specified in clause 8.5.3.1 is invoked with xSb[xSbIdx][ySbIdx], ySb[xSbIdx][ySbIdx], sbWidth, sbHeight, the motion vectors mvLX[xSbIdx][ySbIdx] and the reference picture array refPicLXL as inputs and delta motion vectors dMvLX[xSbIdx][ySbIdx] as outputs with X equal to 0 and 1.

The derivation process for chroma motion vectors in clause 8.5.2.13 is invoked with mvLX[xSbIdx][ySbIdx] and refIdxLX as inputs, and mvCLX[xSbIdx][ySbIdx] as outputs with X equal to 0 and 1.

Otherwise (dmvrFlag is equal to 0), the following applies.

When treeType is equal to SINGLE_TREE and predFlagLX[0][0], with X being 0 or 1, is equal to 1, the derivation process for chroma motion vectors in clause 8.5.2.13 is invoked with mvLX[0][0] and refIdxLX as inputs, and mvCLX[0][0] as output.

The number of luma coding subblocks in horizontal direction numSbX and in vertical direction numSbY are both set equal to 1.

Otherwise, if merge_triangle_flag[xCb][yCb] is equal to 1, inter_affine_flag[xCb][yCb] and merge_subblock_flag[xCb][yCb] are both equal to 0, the derivation process for triangle motion vector components and reference indices as specified in clause 8.5.4.1 is invoked with the luma coding block location (xCb, yCb), the luma coding block width cbWidth and the luma coding block height cbHeight as inputs, and the luma motion vectors mvLA and mvLB, the chroma motion vectors mvCLA and mvCLB, the reference indices refIdxLA and refIdxLB and the prediction list flags predFlagLA and predFlagLB as outputs.

Otherwise (inter_affine_flag[xCb][yCb] or merge_subblock_flag[xCb][yCb] is equal to 1), the derivation process for subblock motion vector components and reference indices as specified in clause 8.5.5.1 is invoked with the luma coding block location (xCb, yCb), the luma coding block width cbWidth, the luma coding block height cbHeight as inputs, and the reference indices refIdxL0 and refIdxL1, the number of luma coding subblocks in horizontal direction numSbX and in vertical direction numSbY, the prediction list utilization flags predFlagLX[xSbIdx][ySbIdx], the luma motion vector array mvLX[xSbIdx][ySbIdx], and the chroma motion vector array mvCLX[xSbIdx][ySbIdx] with xSbIdx=0 . . . (cbWidth>>2)−1, and ySbIdx=0 . . . (cbHeight>>2)−1, and with X being 0 or 1, and the bi-prediction weight index gbiIdx as outputs.

3. The arrays of luma and chroma motion vectors after decoder side motion vector refinement, refMvLX[xSbIdx][ySbIdx] and refMvCLX[xSbIdx][ySbIdx], with X being 0 and 1, are derived as follows for xSbIdx=0 . . . numSbX−1, ySbIdx=0 . . . numSbY−1:

If dmvrFlag is equal to 1, the derivation process for chroma motion vectors in clause 8.5.2.13 is invoked with refMvLX[xSbIdx][ySbIdx] and refIdxLX as inputs, and refMvCLX[xSbIdx][ySbIdx] as output and the input refMvLX[xSbIdx][ySbIdx] is derived as follows:

$$\text{ref}MvLX[xSb\text{Idx}][ySb\text{Idx}]=mvLX[xSb\text{Idx}][ySb\text{Idx}]+dMvLX[xSb\text{Idx}][ySb\text{Idx}] \quad (8\text{-}263)$$

Otherwise (dmvrFlag is equal to 0), the following applies:

$$\text{ref}MvLX[xSb\text{Idx}][ySb\text{Idx}]=mvLX[xSb\text{Idx}][ySb\text{Idx}] \quad (8\text{-}264)$$

$$\text{ref}MvCLX[xSb\text{Idx}][ySb\text{Idx}]=mvCLX[xSb\text{Idx}][ySb\text{Idx}] \quad (8\text{-}265)$$

NOTE—The array refMvLX is stored in MvDmvrLX and used in the derivation process for collocated motion vectors in clause 8.5.2.12. The array of non-refine luma motion vectors MvLX is used in the spatial motion vector prediction and deblocking boundary strength derivation processes.

4. When ciip_flag[xCb][yCb] is equal to 1, the derivation process for intra prediction mode in combined merge and intra prediction as specified in 8.5.6 is invoked.

5. The prediction samples of the current coding unit are derived as follows:

If merge_triangle_flag[xCb][yCb] is equal to 0, the prediction samples of the current coding unit are derived as follows.

The decoding process for inter blocks as specified in clause 8.5.7.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL0[xSbIdx][ySbIdx] and mvL1[xSbIdx][ySbIdx], and the refined luma motion vectors refMvL0[xSbIdx][ySbIdx] and refMvL1[xSbIdx][ySbIdx] with xSbIdx=0 . . . numSbX−1, and ySbIdx=0 . . . numSbY−1, the reference indices refIdxL0 and refIdxL1, the prediction list utilization flags predFlagL0[xSbIdx][ySbIdx] and predFlagL1[xSbIdx][ySbIdx], the generalization bi-prediction weight index gbiIdx, and the variable cIdx set equal to 0 as inputs, and the inter prediction samples (predSamples) that are an (cbWidth)×(cbHeight) array predSamples$_L$ of prediction luma samples as outputs.

The decoding process for inter blocks as specified in clause 8.5.7.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvCL0[xSbIdx][ySbIdx] and mvCL1[xSbIdx][ySbIdx], and the refined chroma motion vectors refMvCL0[xSbIdx][ySbIdx] and refMvCL1[xSbIdx][ySbIdx] with xSbIdx=0 . . . numSbX−1, and ySbIdx=0 . . . numSbY−1, the reference indices refIdxL0 and refIdxL1, the prediction list utilization flags predFlagL0[xSbIdx][ySbIdx] and predFlagL1[xSbIdx][ySbIdx], the generalization bi-prediction weight index gbiIdx, and the variable cIdx set equal to 1 as inputs, and the inter prediction samples (predSamples) that are an (cbWidth/2)×(cbHeight/2) array predSamples$_{Cb}$ of prediction chroma samples for the chroma components Cb as outputs.

The decoding process for inter blocks as specified in clause 8.5.7.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvCL0[xSbIdx][ySbIdx] and mvCL1[xSbIdx][ySbIdx], and the refined chroma motion vectors refMvCL0[xSbIdx][ySbIdx] and refMvCL1[xSbIdx][ySbIdx] with xSbIdx=0 . . . numSbX−1, and ySbIdx=0 . . . numSbY−1, the reference indices refIdxL0 and refIdxL1, the prediction list utilization flags predFlagL0[xSbIdx][ySbIdx] and predFlagL1[xSbIdx][ySbIdx], the generalization bi-prediction weight index gbiIdx, and the variable cIdx set equal to 2 as inputs, and the inter prediction samples (predSamples) that are an (cbWidth/2)×(cbHeight/2) array predSamples$_{Cr}$ of prediction chroma samples for the chroma components Cr as outputs.

Otherwise (merge_triangle_flag[xCb][yCb] is equal to 1), the decoding process for triangular inter blocks as specified in clause 8.5.8.1 is invoked with the luma coding block location (xCb, yCb), the luma coding block width cbWidth and the luma coding block height cbHeight, the luma motion vectors mvLA and mvLB, the chroma motion vectors mvCLA and mvCLB, the reference indices refIdxLA and refIdxLB, and the prediction list flags predFlagLA and predFlagLB as inputs, and the inter prediction samples (predSamples) that are an (cbWidth)×(cbHeight) array predSamples$_L$ of prediction luma samples and two (cbWidth/2)×(cbHeight/2) arrays predSamples$_{Cb}$ and predSamples$_{Cr}$ of prediction chroma samples, one for each of the chroma components Cb and Cr, as outputs.

6. The variables NumSbX[xCb][yCb] and NumSbY[xCb][yCb] are set equal to numSbX and numSbY, respectively.

7. The residual samples of the current coding unit are derived as follows.

The decoding process for the residual signal of coding blocks coded in inter prediction mode as specified in clause 8.5.9 is invoked with the location (xTb0, yTb0) set equal to the luma location (xCb, yCb), the width nTbW set equal to the luma coding block width cbWidth, the height nTbH set equal to the luma coding block height cbHeight and the variable cIdxset equal to 0 as inputs, and the array resSamples$_L$ as output.

The decoding process for the residual signal of coding blocks coded in inter prediction mode as specified in clause 8.5.9 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 1 as inputs, and the array resSamples$_{Cb}$ as output.

The decoding process for the residual signal of coding blocks coded in inter prediction mode as specified in clause 8.5.9 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 2 as inputs, and the array resSamples$_{Cr}$ as output.

8. The reconstructed samples of the current coding unit are derived as follows:

The picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamples$_L$ and the (cbWidth)×(cbHeight) array resSamples set equal to resSamples$_L$ as inputs, and the output is a modified reconstructed picture before in-loop filtering.

The picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to predSamples$_{Cb}$ and the (cbWidth/2)×(cbHeight/2) array resSamples set equal to resSamples$_{Cb}$ as inputs, and the output is a modified reconstructed picture before in-loop filtering.

The picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to predSamples$_{Cr}$ and the (cbWidth/2)×(cbHeight/2) array resSamples set equal to resSamples$_{Cr}$ as inputs, and the output is a modified reconstructed picture before in-loop filtering.

Derivation process for merge motion vector difference is discussed.

Inputs to this process are:
a luma location (xCb, yCb) of the top-left sample of the current luma coding block relative to the top-left luma sample of the current picture,
reference indices refIdxL0 and refIdxL1,
prediction list utilization flags predFlagL0 and predFlagL1.

Outputs of this process are the luma merge motion vector differences in 1/16 fractional-sample accuracy mMvdL0 and mMvdL1.

The variable currPic specifies the current picture.

The luma merge motion vector differences mMvdL0 and mMvdL1 are derived as follows. If both predFlagL0 and predFlagL1 are equal to 1, the following applies:

$$\text{currPocDiffL0} = \text{DiffPicOrderCnt}(\text{currPic}, \text{RefPicList}[0][\text{refIdx}L0]) \qquad (8\text{-}356)$$

$$\text{currPocDiffL1} = \text{DiffPicOrderCnt}(\text{currPic}, \text{RefPicList}[1][\text{refIdx}L1]) \qquad (8\text{-}357)$$

If currPocDiffL0 is equal to currPocDiffL1, or the nuh_layer_id of RefPicList[0][refIdxL0] or RefPicList[1][refIdxL1] is the same as the current picture, the following applies:

$$mMvdL0[0]=MmvdOffset[xCb][yCb][0] \quad (8\text{-}358)$$

$$mMvdL0[1]=MmvdOffset[xCb][yCb][1] \quad (8\text{-}359)$$

$$mMvdL1[0]=MmvdOffset[xCb][yCb][0] \quad (8\text{-}360)$$

$$mMvdL1[1]=MmvdOffset[xCb][yCb][1] \quad (8\text{-}361)$$

Otherwise, if Abs(currPocDiffL0) is greater than or equal to Abs(currPocDiffL1), the following applies:

$$td=\text{Clip3}(-128,127,\text{currPocDiff}L0) \quad (8\text{-}362)$$

$$tb=\text{Clip3}(-128,127,\text{currPocDiff}L1) \quad (8\text{-}363)$$

$$tx=(16384+(\text{Abs}(td)>>1))/td \quad (8\text{-}364)$$

$$\text{distScaleFactor}=\text{Clip3}(-4096,4095,(tb*tx+32)>>6) \quad (8\text{-}365)$$

$$mMvdL0[0]=MmvdOffset[xCb][yCb][0] \quad (8\text{-}366)$$

$$mMvdL0[1]=MmvdOffset[xCb][yCb][1] \quad (8\text{-}367)$$

$$mMvdL1[0]=\text{Clip3}(-2^{15},2^{15}-1,\text{Sign}$$
$$(\text{distScaleFactor}*mMvdL0[0])*$$
$$((\text{Abs}(\text{distScaleFactor}*mMvdL0[0])+127)>>8)) \quad (8\text{-}368)$$
$$mMvdL1[1]=\text{Clip3}(-2^{15},2^{15}-1,\text{Sign}$$
$$(\text{distScaleFactor}*mMvdL0[1])*((\text{Abs}$$
$$(\text{distScaleFactor}*mMvdL0[1])+127)>>8)) \quad (8\text{-}369)$$

Otherwise (Abs(currPocDiffL0) is less than Abs(currPocDiffL1)), the following applies:

$$td=\text{Clip3}(-128,127,\text{currPocDiff}L1) \quad (8\text{-}370)$$

$$tb=\text{Clip3}(-128,127,\text{currPocDiff}L0) \quad (8\text{-}371)$$

$$tx=(16384+(\text{Abs}(td)>>1))/td \quad (8\text{-}372)$$

$$\text{distScaleFactor}=\text{Clip3}(-4096,4095,(tb*tx+32)>>6) \quad (8\text{-}373)$$

$$mMvdL1[0]=MmvdOffset[xCb][yCb][0] \quad (8\text{-}374)$$

$$mMvdL1[1]=MmvdOffset[xCb][yCb][1] \quad (8\text{-}375)$$

$$mMvdL0[0]=\text{Clip3}(-2^{15},2^{15}-1,\text{Sign}$$
$$(\text{distScaleFactor}*mMvdL1[0])*((\text{Abs}$$
$$(\text{distScaleFactor}*mMvdL1[0])+127)>>8)) \quad (8\text{-}376)$$

$$mMvdL0[1]=\text{Clip3}(-2^{15},2^{15}-1,\text{Sign}$$
$$(\text{distScaleFactor}*mMvdL1[1])*((\text{Abs}$$
$$(\text{distScaleFactor}*mMvdL1[1])+127)>>8)) \quad (8\text{-}377)$$

Otherwise (predFlagL0 or predFlagL1 are equal to 1), the following applies for X being 0 and 1:

$$mMvdLX[0]=(\text{predFlag}LX==1)?MmvdOffset[xCb]$$
$$[yCb][0]:0 \quad (8\text{-}378)$$

$$mMvdLX[1]=(\text{predFlag}LX==1)?MmvdOffset[xCb]$$
$$[yCb][1]:0 \quad (8\text{-}379)$$

Decoding process for inter blocks is discussed.

This process is invoked when decoding a coding unit coded in inter prediction mode.

Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, variables numSbX and numSbY specifying the number of luma coding subblocks in horizontal and vertical direction, the motion vectors mvL0[xSbIdx][ySbIdx] and mvL1[xSbIdx][ySbIdx] with xSbIdx=0 numSbX−1, and ySbIdx=0 numSbY−1, the refined motion vectors refMvL0[xSbIdx][ySbIdx] and refMvL1[xSbIdx][ySbIdx] with xSbIdx=0 numSbX−1, and ySbIdx=0 numSbY−1, the reference indices refIdxL0 and refIdxL1, the prediction list utilization flags predFlagL0[xSbIdx][ySbIdx] and predFlagL1[xSbIdx][ySbIdx] with xSbIdx=0 . . . numSbX−1, and ySbIdx=0 numSbY−1, the bi-prediction weight index gbiIdx, a variable cIdx specifying the colour component index of the current block.

Outputs of this process are:

an array predSamples of prediction samples.

Let predSamplesL0$_L$, predSamplesL0$_L$ and predSamplesIntra$_L$ be (cbWidth)×(cbHeight) arrays of predicted luma sample values and, predSamplesL0$_{Cb}$, predSamplesL1$_{Cb}$, predSamplesL0$_{Cr}$, and predSamplesL1$_{Cr}$, predSamplesIntra$_{Cb}$, and predSamplesIntra$_{Cr}$ be (cbWidth/2)×(cbHeight/2) arrays of predicted chroma sample values.

The width and the height of the current coding sublock subCbWidth, subCbHeight in luma samples are derived as follows:

$$sbWidth=cbWidth/numSbX \quad (8\text{-}793)$$

$$sbHeight=cbHeight/numSbY \quad (8\text{-}794)$$

For each coding subblock at subblock index (xSbIdx, ySbIdx) with xSbIdx=0 . . . numSbX−1, and ySbIdx=0 . . . numSbY−1, the following applies.

The luma location (xSb, ySb) specifying the top-left sample of the current coding subblock relative to the top-left luma sample of the current picture is derived as follows:

$$(xSb,ySb)=(xCb+xSbIdx*sbWidth,yCb+ySbIdx*sbHeight) \quad (8\text{-}795)$$

The variable currPic specifies the current picture and the variable bdofFlag is derived as follows.

If all of the following conditions are true, bdofFlag is set equal to TRUE.

sps_bdof_enabled_flag is equal to 1.

predFlagL0[xSbIdx][ySbIdx] and predFlagL1[xSbIdx][ySbIdx] are both equal to 1.

DiffPicOrderCnt(currPic, RefPicList[0][refIdxL0])*DiffPicOrderCnt (currPic, RefPicList[1][refIdxL1]) is less than 0.

MotionModelIdc[xCb][yCb] is equal to 0.

merge_subblock_flag[xCb][yCb] is equal to 0.

GbiIdx[xCb][yCb] is equal to 0.

cIdx is equal to 0.

The nuh_layer_id of RefPicList[0][refIdxL0] is the same as the current picture.

The nuh_layer_id of RefPicList[1][refIdxL1] is the same as the current picture.

Otherwise, bdofFlag is set equal to FALSE.

For X being each of 0 and 1, when predFlagLX[xSbIdx][ySbIdx] is equal to 1, the following applies.

The reference picture consisting of an ordered two-dimensional array refPicLX$_L$ of luma samples and two ordered two-dimensional arrays refPicLX$_{Cb}$ and refPicLX$_{Cr}$ of chroma samples is derived by invoking the process specified in clause 8.5.7.2 with X and refIdxLX as inputs.

The motion vector offset mvOffset is set equal to refMvLX[xSbIdx][xSbIdx]−mvLX[xSbIdx][ySbIdx].

When one or more of the following conditions is true, mvOffset[0] is set equal to 0:

xSb is not equal to xCb and mvOffset[0] is less than 0
(xSb+sbWidth) is not equal to (xCb+cbWidth) and mvOffset[0] is greater than 0

When one or more of the following conditions is true, mvOffset[1] is set equal to 0:

ySb is not equal to yCb and mvOffset[1] is less than 0
(ySb+sbHeight) is not equal to (yCb+cbHeight) and mvOffset[1] is greater than 0

If cIdx is equal to 0, the following applies:

The array predSamplesLX$_L$ is derived by invoking the fractional sample interpolation process specified in clause 8.5.7.3 with the luma location (xCb, yCb), the coding subblock width sbWidth, the coding subblock height sbHeight in luma samples, the luma motion vector offset mvOffset, the refined luma motion vector refMvLX[xSb][xSb], the reference array refPicLX$_L$, bdofFlag, and cIdx as inputs.

Otherwise if cIdx is equal to 1, the following applies.

The array predSamplesLX$_{Cb}$ is derived by invoking the fractional sample interpolation process specified in clause 8.5.7.3 with the luma location (xCb, yCb), the coding subblock width sbWidth/2, the coding subblock height sbHeight/2, the chroma motion vector offset mvOffset, the refined chroma motion vector refMvLX[xSb][xSb], the reference array refPicLX$_{Cb}$, bdofFlag, and cIdx as inputs.

Otherwise (cIdx is equal to 2), the following applies.

The array predSamplesLX$_{Cr}$ is derived by invoking the fractional sample interpolation process specified in clause 8.5.7.3 with the luma location (xCb, yCb), the coding subblock width sbWidth/2, the coding subblock height sbHeight/2, the chroma motion vector offset mvOffset, the refined chroma motion vector refMvLX[xSb][xSb], the reference array refPicLX$_{Cr}$, bdofFlag, and cIdx as inputs.

If bdofFlag is equal to TRUE, the following applies.

The variable shift is set equal to Max(2, 14−BitDepth$_Y$).

The variables cuDiffThres, bdofBlkDiffThres, and cuSumDiff are derived as follows:

$$cuDiffThres=(1<<(BitDepth_Y-8+shift))*cbWidth*cbHeight \quad (8\text{-}796)$$

$$bdofBlkDiffThres=1<<(BitDepth_Y-3+shift) \quad (8\text{-}797)$$

$$cuSumDiff=0 \quad (8\text{-}798)$$

For xIdx=0 . . . (sbWidth>>2)−1 and yIdx=0 . . . (sbHeight>>2)−1, the variables bdofBlkSumDiff and the bidirectional optical flow utilization flag bdofUtilizationFlag[xIdx][yIdx] are derived as follows:

$$bdofBlkSumDiff=\Sigma_{i=0}^{2}\Sigma_{j=0}^{2}Abs(predSamplesL0_L[(xIdx<<2)+1+i][(yIdx<<2)+1+j]- predSamplesL1_L[(xIdx<<2)+1+i][(yIdx<<2)+1+j]) \quad (8\text{-}799)$$

$$bdofUtilizationFlag[xIdx][yIdx]=bdofBlkSumDiff>=bdofBlkDiffThres \quad (8\text{-}800)$$

$$cuSumDiff+=bdofBlkSumDiff \quad (8\text{-}801)$$

When cuSumDiff is less than cuDiffThres, bdofFlag is set equal to FALSE.

The array predSamples of prediction samples is derived as follows.

If cIdx is equal to 0, the prediction samples inside the current luma coding subblock, predSamples[x$_L$+xSb][y$_L$+ySb] with x$_L$=0 . . . sbWidth−1 and y$_L$=0 . . . sbHeight−1, are derived as follows:

If bdofFlag is equal to TRUE, the bidirectional optical flow sample prediction process as specified in clause 8.5.7.4 is invoked with nCbW set equal to the luma coding subblock width sbWidth, nCbH set equal to the luma coding subblock height sbHeight and the sample arrays predSamplesL0$_L$ and predSamplesL1$_L$, and the variables predFlagL0[xSbIdx][ySbIdx], predFlagL1[xSbIdx][ySbIdx], refIdxL0, refIdxL1 and bdofUtilizationFlag[xIdx][yIdx] with xIdx=0 . . . (sbWidth>>2)−1, yIdx=0 . . . (sbHeight>>2)−1 as inputs, and predSamples[x$_L$+xSb][y$_L$+ySb] as outputs.

Otherwise (bdofFlag is equal to FALSE), the weighted sample prediction process as specified in clause 8.5.7.5 is invoked with the luma coding subblock width sbWidth, the luma coding subblock height sbHeight and the sample arrays predSamplesL0$_L$ and predSamplesL1$_L$, and the variables predFlagL0[xSbIdx][ySbIdx], predFlagL1[xSbIdx][ySbIdx], refIdxL0, gbiIdx, and cIdx as inputs, and predSamples[x$_L$+xSb][y$_L$+ySb] as outputs.

Otherwise, if cIdx is equal to 1, the prediction samples inside the current chroma component Cb coding block, predSamples [x$_C$+xCb/2][y$_C$+yCb/2] with x$_C$=0 . . . cbWidth/2−1 and y$_C$=0 . . . cbHeight/2−1, are derived by invoking the weighted sample prediction process specified in clause 8.5.7.5 with the coding block width nCbW set equal to cbWidth/2, the coding block height nCbH set equal to cbHeight/2, the sample arrays predSamplesL0$_{Cb}$ and predSamplesL1$_{Cb}$, and the variables predFlagL0[xSbIdx][ySbIdx], predFlagL1[xSbIdx][ySbIdx], refIdxL0, refIdxL1, gbiIdx, and cIdx as inputs.

Otherwise (cIdx is equal to 2), the prediction samples inside the current chroma component Cr coding block, predSamples[x$_C$+xCb/2][y$_C$+yCb/2] with x$_C$=0 . . . cbWidth/2−1 and y$_C$=0 . . . cbHeight/2−1, are derived by invoking the weighted sample prediction process specified in clause 8.5.7.5 with the coding block width nCbW set equal to cbWidth/2, the coding block height nCbH set equal to cbHeight/2, the sample arrays predSamplesL0$_{Cr}$ and predSamplesL1$_{Cr}$, and the variables predFlagL0[xSbIdx][ySbIdx], predFlagL1[xSbIdx][ySbIdx], refIdxL0, refIdxL1, gbiIdx, and cIdx as inputs.

When cIdx is equal to 0, the following assignments are made for x=0 . . . sbWidth−1 and y=0 . . . sbHeight−1:

$$MvL0[xSb+x][ySb+y]=mvL0[xSbIdx][ySbIdx] \quad (8\text{-}802)$$

$$MvL1[xSb+x][ySb+y]=mvL1[xSbIdx][ySbIdx] \quad (8\text{-}803)$$

$$MvDmvrL0[xSb+x][ySb+y]=refMvL0[xSbIdx][ySbIdx] \quad (8\text{-}804)$$

$$MvDmvrL1[xSb+x][ySb+y]=refMvL1[xSbIdx][ySbIdx] \quad (8\text{-}805)$$

$$RefIdxL0[xSb+x][ySb+y]=refIdxL0 \quad (8\text{-}806)$$

$$RefIdxL1[xSb+x][ySb+y]=refIdxL1 \quad (8\text{-}807)$$

$$PredFlagL0[xSb+x][ySb+y]=predFlagL0[xSbIdx][ySbIdx] \quad (8\text{-}808)$$

$$PredFlagL1[xSb+x][ySb+y]=predFlagL1[xSbIdx][ySbIdx] \quad (8\text{-}809)$$

$$GbiIdx[xSb+x][ySb+y]=gbiIdx \quad (8\text{-}810)$$

When ciip_flag[xCb][yCb] is equal to 1, the array predSamples of prediction samples is modifed as follows.

If cIdx is equal to 0, the following applies.

The general intra sample prediction process as specified in clause 8.4.4.2.1 is invoked with the location (xTbCmp, yTbCmp) set equal to (xCb, yCb), the intra prediction mode predModeIntra set equal to IntraPredModeY[xCb][yCb], the transform block width nTbW and height nTbH set equal to cbWidth and cbHeight, the coding block width nCbW and height nCbH set equal to cbWidth and cbHeight, and the variable cIdx as inputs, and the output is assigned to the (cbWidth)×(cbHeight) array predSamplesIntra$_L$.

The weighted sample prediction process for combined merge and intra prediction as specified in clause 8.5.7.6 is invoked with the coding block width cbWidth, the coding block height cbHeight, the sample arrays predSamplesInter and predSamplesIntra set equal to predSamples and predSamplesIntra$_L$, respectively, the intra prediction mode predModeIntra set equal to IntraPredModeY[xCb][yCb], and the colour component index cIdx as inputs, and the output is assigend to the (cbWidth)×(cbHeight) array predSamples.

Otherwise, if cIdx is equal to 1, the following applies.

The general intra sample prediction process as specified in clause 8.4.4.2.1 is invoked with the location (xTbCmp, yTbCmp) set equal to (xCb/2, yCb/2), the intra prediction mode predModeIntra set equal to IntraPredModeY[xCb][yCb], the transform block width nTbW and height nTbH set equal to cbWidth/2 and cbHeight/2, the coding block width nCbW and height nCbH set equal to cbWidth/2 and cbHeight/2, and the variable cIdx as inputs, and the output is assigned to the (cbWidth/2)×(cbHeight/2) array predSamplesIntra$_{Cb}$.

The weighted sample prediction process for combined merge and intra prediction as specified in clause 8.5.7.6 is invoked with the coding block width cbWidth/2, the coding block height cbHeight/2, the sample arrays predSamplesInter and predSamplesIntra set equal to predSamples$_{Cb}$ and predSamplesIntra$_{Cb}$, respectively, the intra prediction mode predModeIntra set equal to IntraPredModeY[xCb][yCb], and the colour component index cIdx as inputs, and the output is assigend to the (cbWidth/2)×(cbHeight/2) array predSamples.

Otherwise (cIdx is equal to 2), the following applies:

The general intra sample prediction process as specified in clause 8.4.4.2.1 is invoked with the location (xTbCmp, yTbCmp) set equal to (xCb/2, yCb/2), the intra prediction mode predModeIntra set equal to IntraPredModeY[xCb][yCb], the transform block width nTbW and height nTbH set equal to cbWidth/2 and cbHeight/2, the coding block width nCbW and height nCbH set equal to cbWidth/2 and cbHeight/2, and the variable cIdx as inputs, and the output is assigned to the (cbWidth/2)×(cbHeight/2) array predSamplesIntra$_{Cr}$.

The weighted sample prediction process for combined merge and intra prediction as specified in clause 8.5.7.6 is invoked with the coding block width cbWidth/2, the coding block height cbHeight/2, the sample arrays predSamplesInter and predSamplesIntra set equal to predSamples$_{Cr}$ and predSamplesIntra$_{Cr}$, respectively, the intra prediction mode predModeIntra set equal to IntraPredModeY[xCb][yCb], and the colour component index cIdx as inputs, and the output is assigend to the (cbWidth/2)×(cbHeight/2) array predSamples.

Figure 11:
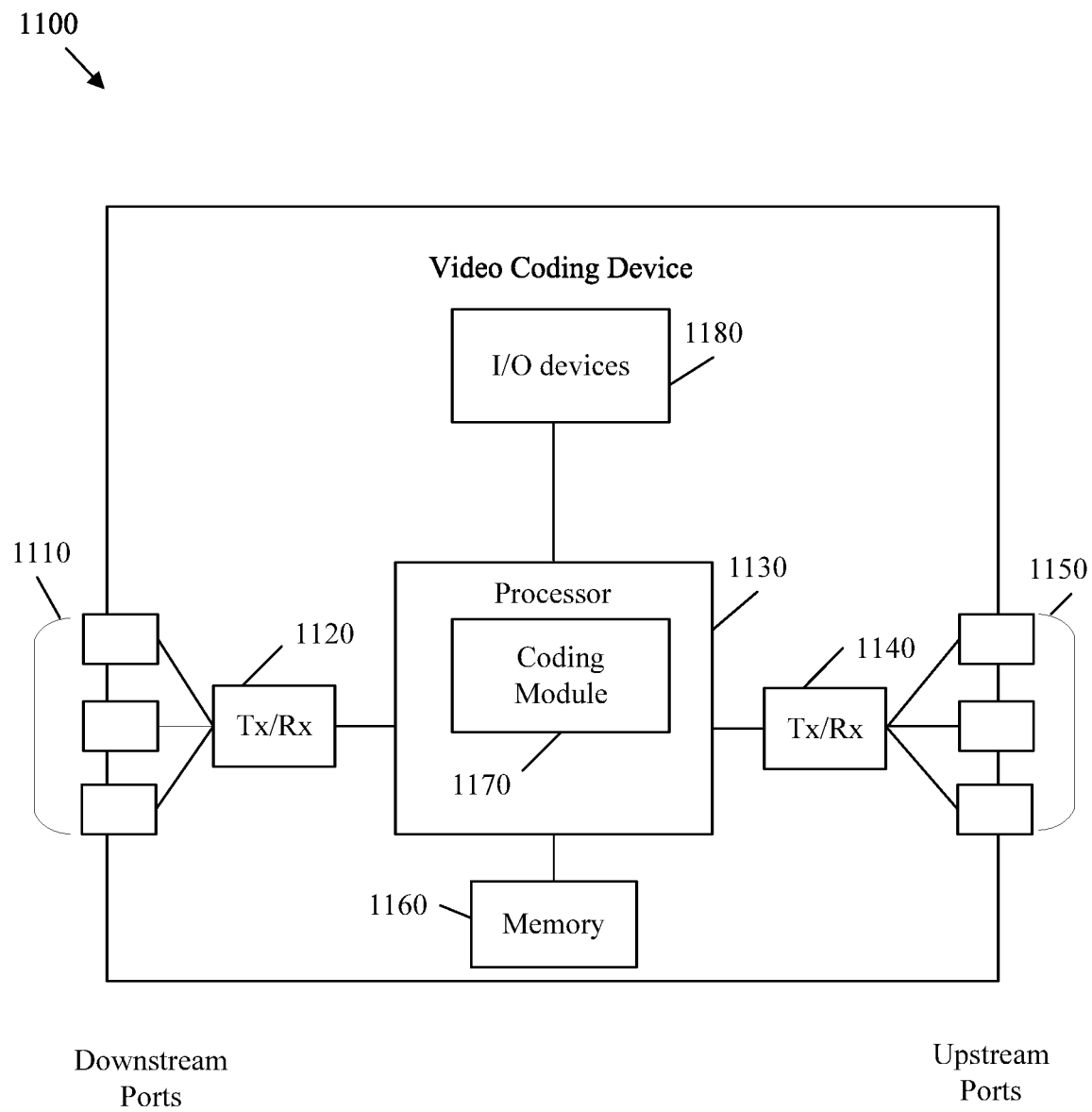
FIG. 11 is a schematic diagram of a video coding device.

FIG. 11 is a schematic diagram of a video coding device 1100 (e.g., a video encoder 20 or a video decoder 30) according to an embodiment of the disclosure. The video coding device 1100 is suitable for implementing the disclosed embodiments as described herein. The video coding device 1100 comprises ingress ports 1110 and receiver units (Rx) 1120 for receiving data; a processor, logic unit, or central processing unit (CPU) 1130 to process the data; transmitter units (Tx) 1140 and egress ports 1150 for transmitting the data; and a memory 1160 for storing the data. The video coding device 1100 may also comprise optical-to-electrical (OE) components and electrical-to-optical (EO) components coupled to the ingress ports 1110, the receiver units 1120, the transmitter units 1140, and the egress ports 1150 for egress or ingress of optical or electrical signals.

The processor 1130 is implemented by hardware and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with the ingress ports 1110, receiver units 1120, transmitter units 1140, egress ports 1150, and memory 1160. The processor 1130 comprises a coding module 1170. The coding module 1170 implements the disclosed embodiments described above. For instance, the coding module 1170 implements, processes, prepares, or provides the various codec functions. The inclusion of the coding module 1170 therefore provides a substantial improvement to the functionality of the video coding device 1100 and effects a transformation of the video coding device 1100 to a different state. Alternatively, the coding module 1170 is implemented as instructions stored in the memory 1160 and executed by the processor 1130.

The video coding device 1100 may also include input and/or output (I/O) devices 1180 for communicating data to and from a user. The I/O devices 1180 may include output devices such as a display for displaying video data, speakers for outputting audio data, etc. The I/O devices 1180 may also include input devices, such as a keyboard, mouse, trackball, etc., and/or corresponding interfaces for interacting with such output devices.

The memory 1160 comprises one or more disks, tape drives, and solid-state drives and may be used as an overflow data storage device, to store programs when such programs are selected for execution, and to store instructions and data that are read during program execution. The memory 1160 may be volatile and/or non-volatile and may be read-only memory (ROM), random access memory (RAM), ternary content-addressable memory (TCAM), and/or static random-access memory (SRAM).

Figure 12:
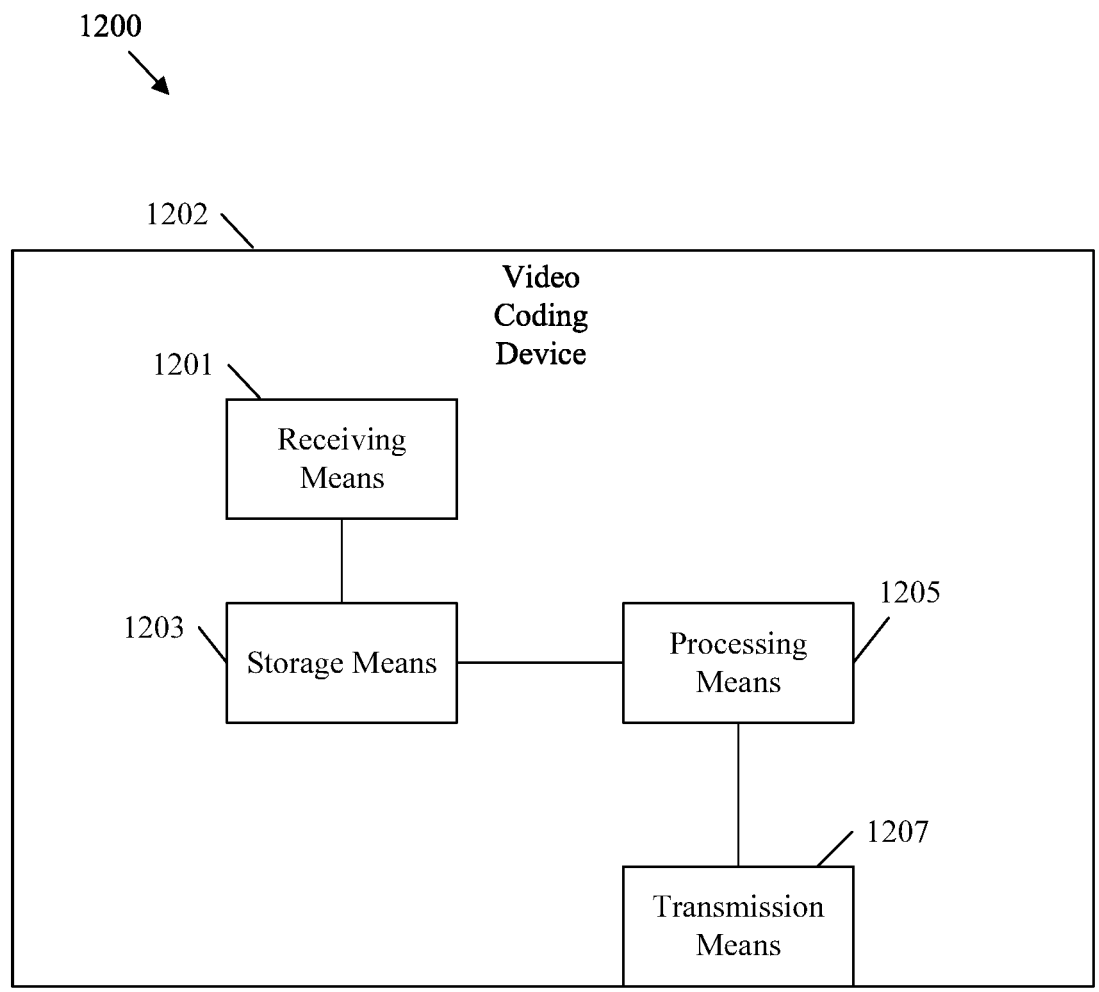
FIG. 12 is a schematic diagram of an embodiment of a means for coding.

FIG. 12 is a schematic diagram of an embodiment of a means for coding 1200. In an embodiment, the means for coding 1200 is implemented in a video coding device 1202 (e.g., a video encoder 20 or a video decoder 30). The video coding device 1202 includes receiving means 1201. The receiving means 1201 is configured to receive a picture to encode or to receive a bitstream to decode. The video coding device 1202 includes transmission means 1207 coupled to the receiving means 1201. The transmission means 1207 is configured to transmit the bitstream to a decoder or to transmit a decoded image to a display means (e.g., one of the I/O devices 1180).

The video coding device 1202 includes a storage means 1203. The storage means 1203 is coupled to at least one of the receiving means 1201 or the transmission means 1207. The storage means 1203 is configured to store instructions. The video coding device 1202 also includes processing means 1205. The processing means 1205 is coupled to the storage means 1203. The processing means 1205 is configured to execute the instructions stored in the storage means 1203 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding a coded video bitstream implemented by a video decoder, comprising:
   receiving the coded video bitstream containing reference picture lists;
   obtaining reference pictures for a current picture from the reference picture lists;
   setting a decoder motion vector refinement (DMVR) flag to a first value to enable DMVR for a current block of the current picture when the reference pictures are in a same layer as the current picture;
   setting the DMVR flag to a second value to disable the DMVR for the current block of the current picture when the reference pictures are in a different layer than the current picture; and
   refining a motion vector corresponding to the current block when the DMVR flag is set to the first value.

2. The method of claim 1, further comprising enabling reference picture resampling (RPR) for an entire coded video sequence (CVS) containing the current picture even when the DMVR is disabled.

3. The method of claim 1, further comprising using a layer identifier to determine whether the reference pictures and the current picture are in the same layer or whether the reference pictures are in the different layer than the current picture.

4. The method of claim 3, wherein the layer identifier is designated as nuh_layer_id.

5. The method of claim 1, wherein the DMVR flag is set in a slice header of the coded video bitstream.

6. The method of claim 1, further comprising displaying on a display of an electronic device an image generated using the current block.

7. A method of encoding a video bitstream implemented by a video encoder, the method comprising:
   obtaining reference pictures for a current picture from reference picture lists;
   setting a decoder motion vector refinement (DMVR) flag to a first value to enable DMVR for a current block of the current picture when the reference pictures are in a same layer as the current picture;
   setting the DMVR flag to a second value to disable the DMVR for the current block of the current picture when the reference pictures are in a different layer than the current picture; and
   refining a motion vector corresponding to the current block when the DMVR flag is set to the first value.

8. The method of claim 7, wherein following the obtaining, the method comprises:
   determining motion vectors for the current picture based on the reference pictures;
   encoding the current picture based on the motion vectors; and
   decoding the current picture using a hypothetical reference decoder.

9. The method of claim 7, further comprising enabling reference picture resampling (RPR) for an entire coded video sequence (CVS) containing the current picture even when the DMVR is disabled.

10. The method of claim 7, further comprising using a layer identifier to determine whether the reference pictures and the current picture are in the same layer or whether the reference pictures are in the different layer than the current picture.

11. The method of claim 10, wherein the layer identifier is designated as nuh_layer_id.

12. The method of claim 7, wherein the DMVR flag is set in a slice header of the video bitstream.

13. The method of claim 7, further comprising transmitting the video bitstream containing the current block toward a video decoder.

14. A decoding device, comprising:
   a memory storing instructions; and
   one or more processors coupled to the memory, the one or more processors configured to execute the instructions to cause the decoding device to:
      receive a coded video bitstream containing reference picture lists;
      obtain reference pictures for a current picture from the reference picture lists;
      set a decoder motion vector refinement (DMVR) flag to a first value to enable DMVR for a current block of the current picture when the reference pictures are in a same layer as the current picture;
      set the DMVR flag to a second value to disable the DMVR for the current block of the current picture when the reference pictures are in a different layer than the current picture; and
      refine a motion vector corresponding to the current block when the DMVR flag is set to the first value.

15. The decoding device of claim 14, wherein reference picture resampling (RPR) is enabled for an entire coded video sequence (CVS) containing the current picture even when the DMVR is disabled.

16. The decoding device of claim 14, further comprising a display configured to display an image generated based on the current block.

17. An encoding device, comprising:
   a memory containing instructions;
   one or more processors coupled to the memory, the one or more processors configured to implement the instructions to cause the encoding device to:
      obtain reference pictures for a current picture from reference picture lists;

set a decoder motion vector refinement (DMVR) flag to a first value to enable DMVR for a current block of the current picture when the reference pictures are in a same layer as the current picture;

set the DMVR flag to a second value to disable the DMVR for the current block of the current picture when the reference pictures are in a different layer than the current picture; and refine a motion vector corresponding to the current block when the DMVR flag is set to the first value; and a transmitter coupled to the one or more processors, the transmitter configured to transmit a video bitstream containing the current block toward a video decoder.

18. The encoding device of claim 17, wherein reference picture resampling (RPR) is enabled for an entire coded video sequence (CVS) containing the current picture even when the DMVR is disabled.

19. The encoding device of claim 17, wherein the memory stores the video bitstream prior to the transmitter transmitting the video bitstream toward the video decoder.

* * * * *

UNITED STATES PATENT AND TRADEMARK OFFICE
CERTIFICATE OF CORRECTION

PATENT NO. : 12,363,327 B2  
APPLICATION NO. : 17/541710  
DATED : July 15, 2025  
INVENTOR(S) : Jianle Chen et al.

Page 1 of 1

It is certified that error appears in the above-identified patent and that said Letters Patent is hereby corrected as shown below:

On the Title Page

Item (71) Applicant: Delete "Huawei Technologies Co., Ltd., Guangdong (CN)" and insert -- Huawei Technologies Co., Ltd., Shenzhen (CN) --.

Signed and Sealed this  
Ninth Day of September, 2025

Coke Morgan Stewart  
*Acting Director of the United States Patent and Trademark Office*